US010782553B2

(12) United States Patent
Sugitani et al.

(10) Patent No.: US 10,782,553 B2
(45) Date of Patent: Sep. 22, 2020

(54) DISPLAY DEVICE AND METHOD OF MANUFACTURING THE SAME

(71) Applicant: Samsung Display Co. Ltd., Yongin-si (KR)

(72) Inventors: Koichi Sugitani, Hwaseong-si (KR); Hoon Kang, Suwon-si (KR); Hye In Kim, Hwaseong-si (KR); Yong Hoon Yang, Hwaseong-si (KR); Joo Young Yoon, Suwon-si (KR); Eui Suk Jung, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 187 days.

(21) Appl. No.: 15/867,607

(22) Filed: Jan. 10, 2018

(65) Prior Publication Data

US 2018/0341147 A1 Nov. 29, 2018

(30) Foreign Application Priority Data

May 23, 2017 (KR) .................. 10-2017-0063512

(51) Int. Cl.
*G02F 1/1335* (2006.01)
*G02F 1/1343* (2006.01)
(Continued)

(52) U.S. Cl.
CPC .... *G02F 1/133516* (2013.01); *G02F 1/13439* (2013.01); *G02F 1/133536* (2013.01);
(Continued)

(58) Field of Classification Search
None
See application file for complete search history.

(56) References Cited

U.S. PATENT DOCUMENTS

| 9,547,195 | B2 * | 1/2017 | Guo ................ G02F 1/133617 |
| 2007/0024186 | A1 * | 2/2007 | Chen .................... H01L 27/322 |
| | | | 313/504 |

(Continued)

FOREIGN PATENT DOCUMENTS

| JP | 1999-160514 | 6/1999 |
| JP | 2016-529543 | 9/2016 |

(Continued)

OTHER PUBLICATIONS

David E. Bornside, Mechanism for the Local Planarization of Microscopically Rough Surfaces by Drying Thin Films of Spin-Coated Polymer/Solvent Solutions, Journal of Electrochemical Society, Aug. 1990, pp. 2589-2595, vol. 137, No. 8, The Electrochemical Society, Inc.

*Primary Examiner* — Ryan Crockett
(74) *Attorney, Agent, or Firm* — H.C. Park & Associates, PLC

(57) ABSTRACT

A display device includes a first pixel region (FPR), a second pixel region (SPR), a color conversion pattern (CCP), a first overcoat layer (FOL), a barrier layer (BL), a second overcoat layer (SOL), a liquid crystal layer (LCL), and a switching element (SE). The FPR is configured to display a first color (FC). The SPR is adjacent the FPR, and is configured to display a second color (SC) of a shorter peak wavelength than the FC. The CCP is disposed in the FPR, and is configured to: convert a color of incident light into the FC; and output converted light of the FC. The FOL is disposed on the CCP. The BL is of an inorganic material, and is disposed on the FOL. The SOL is of an organic material, and is disposed on the BL. The LCL is disposed on the SOL. The SE is disposed on the LCL.

18 Claims, 18 Drawing Sheets

(51) Int. Cl.
  *G02F 1/13357* (2006.01)
  *G02F 1/1333* (2006.01)
(52) U.S. Cl.
  CPC .. *G02F 1/133617* (2013.01); *G02F 1/133512* (2013.01); *G02F 2001/133357* (2013.01); *G02F 2001/133519* (2013.01); *G02F 2001/133548* (2013.01)

(56) References Cited

U.S. PATENT DOCUMENTS

| | | | | |
|---|---|---|---|---|
| 2007/0102737 A1* | 5/2007 | Kashiwabara | ...... | H01L 27/3279 257/291 |
| 2011/0169393 A1* | 7/2011 | Gyoda | ......... | H01L 25/048 313/46 |
| 2011/0216271 A1* | 9/2011 | Suzuki | ......... | G02F 1/13362 349/71 |
| 2013/0242228 A1* | 9/2013 | Park | ......... | G02F 1/133377 349/61 |
| 2015/0042933 A1* | 2/2015 | Ueki | ......... | G02B 5/0242 349/108 |
| 2015/0048348 A1* | 2/2015 | Huang | ......... | H01L 27/322 257/40 |
| 2015/0346554 A1* | 12/2015 | Lee | ......... | G02F 1/133377 349/69 |
| 2016/0357068 A1* | 12/2016 | Yang | ......... | G02F 1/133504 |
| 2016/0370655 A1* | 12/2016 | Nagayama | ......... | H01L 51/5281 |
| 2017/0235191 A1* | 8/2017 | Jang | ......... | G02F 1/133617 349/64 |
| 2017/0255054 A1* | 9/2017 | Li | ......... | G02F 1/133512 |
| 2017/0255060 A1* | 9/2017 | Kim | ......... | G02F 1/133512 |
| 2017/0336675 A1* | 11/2017 | Kim | ......... | G02F 1/133536 |
| 2018/0031911 A1* | 2/2018 | Liu | ......... | G02F 1/133514 |
| 2018/0129098 A1* | 5/2018 | Yoon | ......... | G02F 1/133602 |
| 2018/0157123 A1* | 6/2018 | Liang | ......... | G02F 1/133528 |
| 2019/0227385 A1* | 7/2019 | Ahn | ......... | G02F 1/133617 |

FOREIGN PATENT DOCUMENTS

| | | |
|---|---|---|
| JP | 2016-188914 | 11/2016 |
| KR | 10-2013-0027913 | 3/2013 |
| KR | 10-2016-0086739 | * 7/2016 |

* cited by examiner

DISPLAY DEVICE AND METHOD OF MANUFACTURING THE SAME

CROSS-REFERENCE TO RELATED APPLICATION

This application claims priority from and the benefit of Korean Patent Application No. 10-2017-0063512, filed May 23, 2017, which is hereby incorporated by reference for all purposes as if fully set forth herein.

BACKGROUND

Field

The disclosure generally relates to a display device and a method of manufacturing the same.

Discussion

With the development of multimedia, the importance of display devices is increasing. Accordingly, various types of display devices, such as liquid crystal displays (LCDs) and organic light emitting diode displays (OLEDs) are being developed. An LCD typically includes a display panel that may include a pair of panels having field generating electrodes, such as pixel electrodes and a common electrode, and a liquid crystal layer interposed between the two panels and a light source unit that can provide light to the display panel. The LCD arranges liquid crystals by applying voltages to the field generating electrodes and controls the amount of light that passes through the liquid crystal layer in each pixel to display an image.

As one method for allowing each pixel to uniquely display, for instance, a primary color, a method of placing a color conversion pattern for each pixel in a light path from a light source to a viewer can be utilized. For example, a color filter can realize a primary color by absorbing a specific wavelength band of incident light and transmitting only another specific wavelength band. There is a need, however, for methods and techniques that further improve the color purity of a display device.

The above information disclosed in this section is only for enhancement of an understanding of the background of the inventive concepts, and, therefore, it may contain information that does not form prior art already known to a person of ordinary skill in the art.

SUMMARY

A color conversion pattern can convert the color of incident light and emit light having a color different from that of the incident light. However, if the thickness of the color conversion pattern is increased so that the color conversion pattern can have a sufficient degree of color conversion efficiency, a step formed by the color conversion pattern may become excessively large. If the step formed by the color conversion pattern is large, a component disposed on the color conversion pattern, for example, a component having electro-optical functions may not be accurately positioned at a desired position. This can lead to degradation of display quality.

Some exemplary embodiments are capable of providing a display device having improved display quality by including a planarization layer with an improved degree of planarization.

Some exemplary embodiments are capable of providing a method of manufacturing a display device with an improved degree of planarization of a planarization layer.

Additional aspects will be set forth in the detailed description which follows, and, in part, will be apparent from the disclosure, or may be learned by practice of the inventive concepts.

According to some exemplary embodiments, a display device includes a first pixel region, a second pixel region, a color conversion pattern, a first overcoat layer, a barrier layer, a second overcoat layer, a liquid crystal layer, and a switching element. The first pixel region is configured to display a first color. The second pixel region is adjacent to the first pixel region, and is configured to display a second color of a shorter peak wavelength than the first color. The color conversion pattern is disposed in the first pixel region, and is configured to:

convert a color of incident light into the first color; and output converted light of the first color. The first overcoat layer is disposed on the color conversion pattern. The barrier layer is of an inorganic material, and is disposed on the first overcoat layer. The second overcoat layer is of an organic material, and is disposed on the barrier layer. The liquid crystal layer is disposed on the second overcoat layer. The switching element is disposed on the liquid crystal layer.

According to some exemplary embodiments, a display device includes a first panel, a second panel, a liquid crystal layer, a first polarizer, a second polarizer, a first organic layer, an inorganic layer, a second organic layer, a first wavelength band filter, a second wavelength band filter, and a light source. The first panel includes: a first substrate configured to transmit light of a first color in a first region; and a color conversion pattern disposed on the first substrate. The second panel faces the first panel. The second panel includes: a second substrate; and a switching element on the second substrate. The liquid crystal layer is between the first panel and the second panel. The first polarizer is between the first panel and the second panel. The second polarizer is between the first panel and the second panel. The first organic layer is between the first panel and the second panel. The inorganic layer is between the first panel and the second panel. The second organic layer is between the first panel and the second panel. The first wavelength band filter is between the first panel and the second panel. The second wavelength band filter is between the first panel and the second panel. The light source is configured to provide second light of a second color. A peak wavelength of the second color is shorter than a peak wavelength of the first color. In the first region, propagation of at least some of the second light includes a path sequentially through the first polarizer, the liquid crystal layer, the second polarizer, the first organic layer, the inorganic layer, the second organic layer, the first wavelength band filter, the color conversion pattern, and the second wavelength band filter such that the first color is output. The first wavelength band filter is configured to: reflect light of a wavelength band including the peak wavelength of the first color; and transmit light of a wavelength band including the peak wavelength of the second color. The color conversion pattern is configured to: convert a color of incident light into the first color; and output converted light of the first color. The second wavelength band filter is configured to: transmit light of a wavelength band including the peak wavelength of the first color; and absorb or reflect light of a wavelength band including the peak wavelength of the second color.

According to some exemplary embodiments, a method of manufacturing a display device includes: forming a color conversion pattern on a substrate, the color conversion pattern including a wavelength shift material; forming a first overcoat layer on the color conversion pattern; forming a barrier layer on the first overcoat layer; forming a second overcoat layer on the barrier layer; and forming a liquid crystal layer on the second overcoat layer. Forming the first overcoat layer includes: applying a first overcoat composition on the color conversion pattern; and curing the first overcoat composition at a temperature greater than 0° C. and less than or equal to 180° C. Forming the barrier layer includes depositing a barrier layer forming material on the first overcoat layer at a temperature greater than 0° C. and less than or equal to 200° C. Forming the second overcoat layer includes: applying a second overcoat composition on the barrier layer; and curing the second overcoat composition at a temperature greater than 0° C. and less than or equal to 180° C.

According to various exemplary embodiments, a display device includes a planarization layer having a superior degree of planarization. Therefore, despite a step formed by the thickness of a color conversion pattern, a component having electro-optical functions can be accurately placed. This can improve the display quality of the display device.

According to various exemplary embodiments, a method of manufacturing a display device enables the display device to be formed having improved display quality.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

Ha 9 is a cross-sectional view of pixels of a display device according to some exemplary embodiments.

Figure 10:
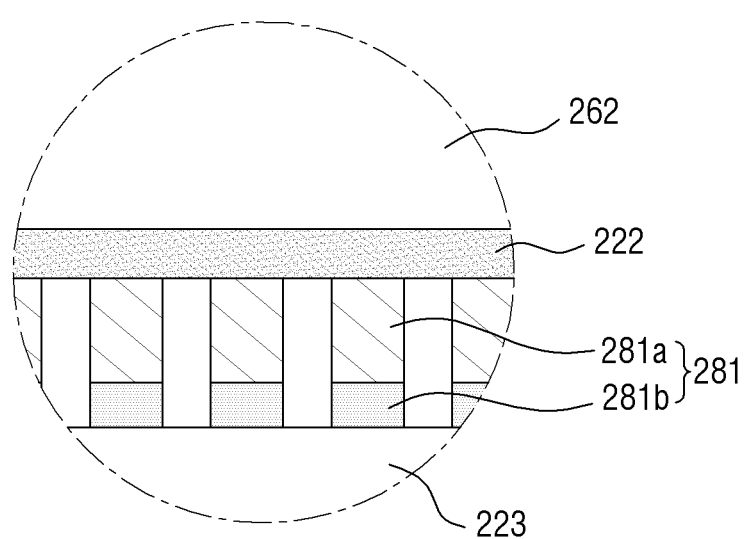

FIG. 10 is an enlarged view of area 9 according to some exemplary embodiments.

FIGS. 11, 12, 13, 14, 15, and 16 are cross-sectional views of a display device at various stages of manufacture according to some exemplary embodiments.

Figure 17:
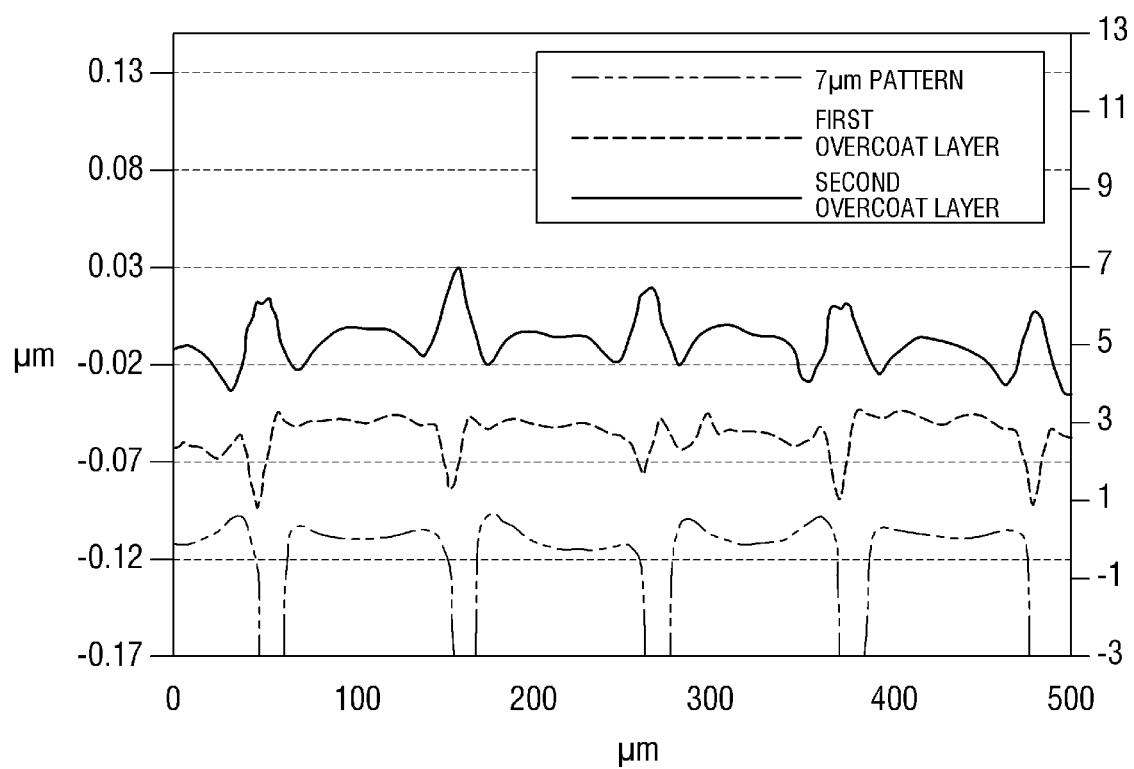
Figure 18:
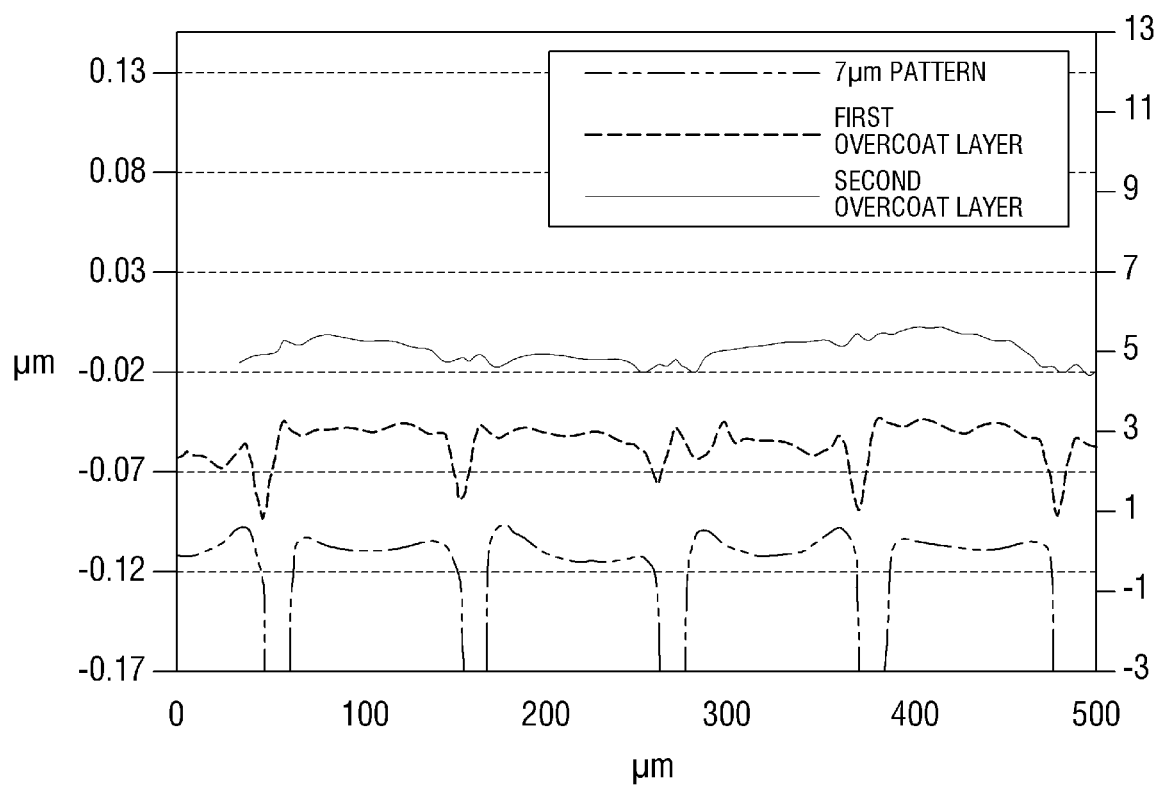

FIGS. 17 and 18 illustrate surface height profiles of a first overcoat layer and a second overcoat layer measured in accordance with various experimental examples.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," "third," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
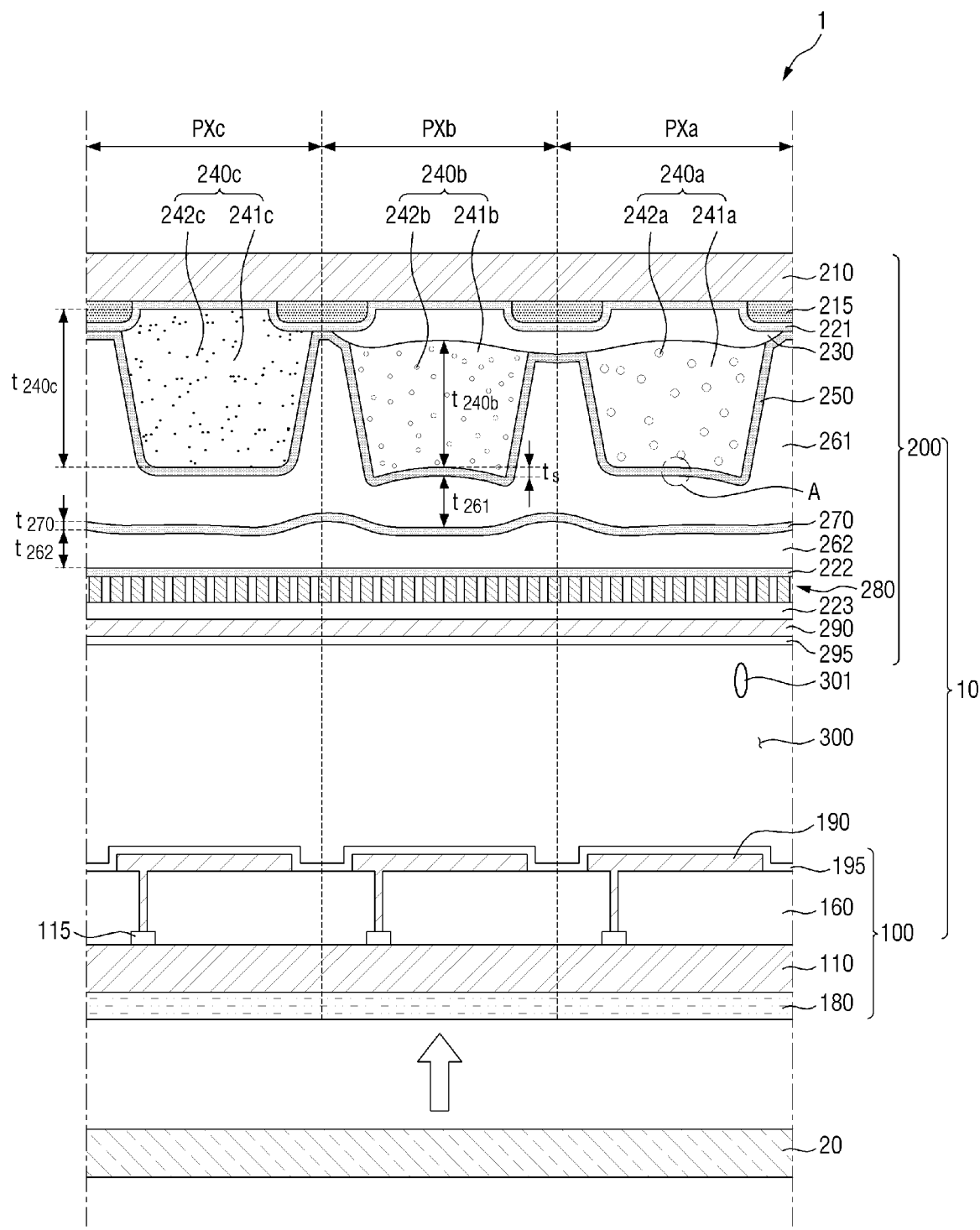
FIG. 1 is a cross-sectional view of pixels of a display device according to some exemplary embodiments.
Figure 2:
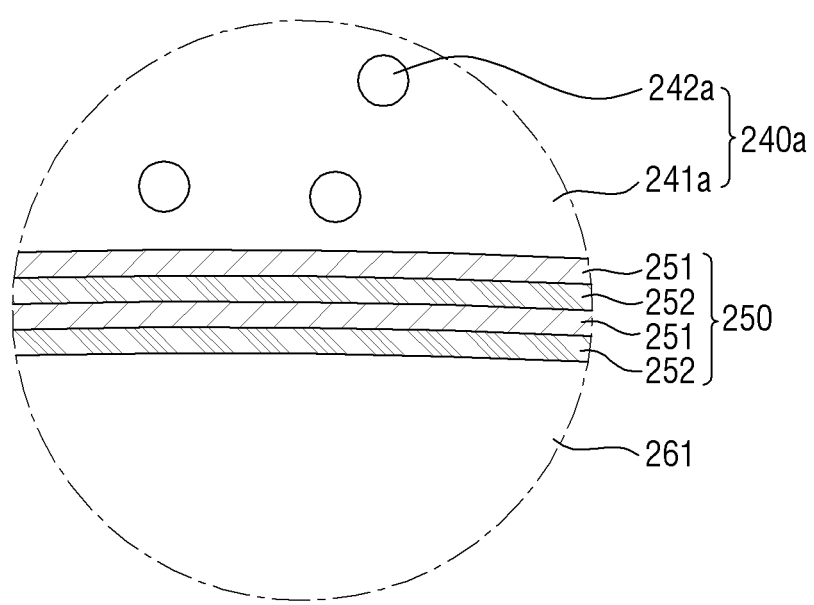
FIG. 2 is an enlarged view of area A in FIG according to some exemplary embodiments.

FIG. 1 is a cross-sectional view of pixels of a display device according to some exemplary embodiments. FIG. 2 is an enlarged view of area A in FIG. 1 according to some exemplary embodiments.

Referring to FIGS. 1 and 2, a display device 1 includes a display panel 10 and a light source unit (or light source) 20 that provides light to the display panel 10.

The display panel 10 may include a lower panel 100, an upper panel 200 facing the lower panel 100, and a liquid crystal layer 300 interposed between the lower panel 100 and the upper panel 200. The liquid crystal layer 300 may be sealed by the lower panel 100, the upper panel 200, and a sealing member (not illustrated) that bonds the lower panel 100 and the upper panel 200 together.

A plurality of pixels (e.g., pixels PXa, PXb, and PXc) arranged in a substantially matrix form when seen from above (e.g., in a plan view) may be defined in the display panel 10. As used herein, "pixels" refer to single regions in which a display area is divided for color display when seen from above, and one pixel is a minimum unit capable of displaying a color independently of other pixels. For instance, each of the pixels may uniquely display one of the primary colors to implement a color display. For example, the pixels may include a first pixel PXa which displays a first color, a second pixel PXb which displays a second color having a shorter peak wavelength than the first color, and a third pixel PXc which displays a third color having a shorter peak wavelength than the second color. The first pixel PXa, the second pixel PXb, and the third pixel PXc arranged adjacent to each other may be repeated as a basic unit. Hereinafter, a case where the first color is red, the second color is green, and the third color is blue will be described as an example.

The light source unit 20 may be disposed under the display panel 10 and emit light having a specific wavelength (or range of wavelengths) toward the display panel 10. The light source unit 20 may include a light source (not shown) that directly emits light and a light guide plate (not illustrated) that guides the light received from the light source toward the display panel 10. The material of the light guide plate is not particularly limited. For example, the light guide plate may be made of a glass material, a quartz material, a plastic material, such as polyethylene terephthalate, polycarbonate, etc., and/or the like.

The light source may be a light emitting diode (LED), an organic light emitting diode (OLED), etc. In some exemplary embodiments, the light source may emit light having a peak wavelength that is shorter than that of each of the first color and the second color. In some exemplary embodiments, the light source may emit light of the third color. The third color may be blue with a peak wavelength in a range of about 430 nanometers (nm) to about 470 nm. That is, the light source unit 20 may provide light of the third color to the display panel 10. In some exemplary embodiments, the light source may emit light having a peak wavelength in an ultraviolet band, and the light source unit 20 may provide the ultraviolet light to the display panel 10.

Although not illustrated, one or more optical sheets may be disposed between the display panel 10 and the light source unit 20. The optical sheets may include one or more of a prism sheet, a diffusion sheet, a (reflective) polarizing sheet, a lenticular lens sheet, and a micro-lens sheet. The optical sheets can improve display quality of the display device 1 by modulating the optical characteristics (e.g., condensing, diffusing, scattering, polarization, etc., characteristics) of light provided from the light source unit 20 and travelling toward the display panel 10.

Next, components of the display panel 10 will be described in more detail.

The lower panel 100 may include a first insulating substrate 110, a plurality of switching elements 115 disposed on the first insulating substrate 110, and a plurality of pixel electrodes 190 respectively disposed on the switching elements 115. The lower panel 100 may further include a first polarizer 180.

The first insulating substrate 110 may be a transparent insulating substrate. For example, the first insulating substrate 110 may be a substrate made of a glass material, a quartz material, a translucent plastic material, etc. In some exemplary embodiments, the first insulating substrate 110 may be flexible, and the display device 1 may be a curved display device.

The switching elements 115 may be disposed on the first insulating substrate 110. The switching elements 115 may be disposed in the first through third pixels PXa through PXc to transmit or block driving signals to the pixel electrodes 190, respectively. In some exemplary embodiments, each of the switching elements 115 may be a thin-film transistor including a gate electrode (not illustrated), an active layer (not shown) disposed on the gate electrode, and a source electrode (not shown) and a drain electrode (not illustrated) disposed on the active layer to be separated from each other. The gate electrode, which is a control terminal, may be connected to a gate line (not illustrated) to receive a gate driving signal. The source electrode, which is an input terminal, may be connected to a data line (not illustrated) to receive a data driving signal. The drain electrode, which is an output terminal, may be electrically connected to each of the pixel electrodes 190. The active layer may be made of amorphous silicon or polycrystalline silicon or may be made of an oxide semiconductor. The active layer may serve as a channel of each of the switching elements 115, and the channel may be turned on or off according to a voltage applied to the gate electrode.

An intermediate layer 160 may be disposed on the switching elements 115. The intermediate layer 160 may electrically insulate components disposed on the intermediate layer 160 from components disposed under the intermediate layer 160, and may planarize steps of a plurality of components stacked on the first insulating substrate 110. The intermediate layer 160 may include one or more layers. For example, the intermediate layer 160 may be a stacked structure of a layer made of an organic material and a layer made of an inorganic material. Examples of the inorganic material that forms the intermediate layer 160 may include silicon nitride ($SiN_x$), silicon oxide ($SiO_x$), silicon nitride oxide ($SiN_xO_y$, where x>y), and silicon oxynitride ($SiO_xN_y$, where x>y). Although not illustrated, a wiring layer including the gate line and the data line may be disposed between the first insulating substrate 110 and the intermediate layer 160.

The pixel electrodes 190 may be disposed on the intermediate layer 160. Each of the pixel electrodes 190 may form an electric field in the liquid crystal layer 300 together with a common electrode 290, which will be described later, thereby controlling the alignment direction of liquid crystals 301 in a corresponding pixel. The pixel electrodes 190 may be electrically connected to the output terminals of the switching elements 115 through contact holes formed in the intermediate layer 160, respectively. The pixel electrodes 190 may be disposed in the pixels PXa through PXc, respectively. Thus, independent voltages can be applied to the pixel electrodes 190 through the switching elements 115. Each of the pixel electrodes 190 may be a transparent electrode made of a transparent conductive material. Examples of the material that forms the transparent electrode include indium tin oxide (ITO) and indium zinc oxide (IZO). Although not illustrated, each of the pixel electrodes 190 may have a plurality of micro-slits.

A first liquid crystal alignment layer 195 may be disposed on the pixel electrodes 190. The first liquid crystal alignment layer 195 can induce an initial alignment of the liquid crystals 301 in the adjacent liquid crystal layer 300. As used herein, "initial alignment of liquid crystals" denotes alignment of liquid crystals in a state where no electric field has been formed in the liquid crystal layer 300. The first liquid crystal alignment layer 195 may be made of a polymer organic material having an imide group in a repeating unit of a main chain.

The first polarizer 180 may be disposed between the liquid crystal layer 300 and the light source unit 20. The first polarizer 180 may be an absorptive polarizer or a reflective polarizer. For example, the absorptive polarizer may give polarity to transmitted light by absorbing a polarization component parallel to an absorption axis and transmitting a polarization component parallel to a transmission axis. In FIG. 1 and the like, a case where the first polarizer 180 is located on a surface of the first insulating substrate 110 on the side of the light source unit 20 is illustrated as an example. However, the first polarizer 180 can also be disposed between the first insulating substrate 110 and the liquid crystal layer 300.

The liquid crystal layer 300 includes a plurality of initially aligned liquid crystals 301. The liquid crystals 301 may have negative dielectric anisotropy and may be vertically aligned in an initial alignment state. The liquid crystals 301 may have a determined pretilt angle in the initial alignment state. The initial alignment of the liquid crystals 301 can be induced by the first liquid crystal alignment layer 195 and a second liquid crystal alignment layer 295. When an electric field is formed between the pixel electrodes 190 and the common electrode 290, the liquid crystals 301 may be tilted or rotated in a specific direction to change the polarization state of light transmitted through the liquid crystal layer 300. In some exemplary embodiments, the liquid crystals 301 may have positive dielectric anisotropy and may be horizontally aligned in the initial alignment state.

The upper panel 200 may include a second insulating substrate 210, color conversion patterns 240a and 240b disposed on the second insulating substrate 210, a second polarizer 280 disposed on the color conversion patterns 240a and 240b, and the common electrode 290 disposed on the second polarizer 280.

Like the first insulating substrate 110, the second insulating substrate 210 may be a transparent insulating substrate. A light shielding member 215 may be disposed on the second insulating substrate 210. The light shielding member 215 may be disposed at boundaries between adjacent pixels in a substantially quadrilateral grid shape when seen from above. The light shielding member 215 can prevent (or reduce) a color mixture defect between neighboring pixels by blocking transmission of light. The light shielding member 215 is not particularly limited as long as it can block transmission of light. For example, the light shielding member 215 may be made of a black matrix or an opaque metal material. On a light path extending from the light source unit 20 to a viewer (not illustrated) located with respect to an upper side of the second insulating substrate 210, the light shielding member 215 may be disposed closer to the viewer side to minimize the color mixture defect.

A first protective layer 221 may be disposed on the light shielding member 215. The first protective layer 221 may be integrally formed without distinction between the pixels PXa through PXc to cover the entire (or substantially entire) surface of the second insulating substrate 210. For example, the first protective layer 221 can be in contact with the light shielding member 215, a first wavelength band filter 230, and a light transmitting pattern 240c. The first protective layer 221 may be made of an inorganic insulating material, such as silicon nitride or silicon oxide. The first protective layer 221 can prevent (or reduce) the light shielding member 215 from being damaged or corroded during a process of manufacturing the upper panel 200. In some exemplary embodiments, the first protective layer 221 may be omitted, and the first wavelength band filter 230 and the light transmitting pattern 240c may be disposed directly on the second insulating substrate 210 and the light shielding member 215.

The first wavelength band filter 230 may be disposed on the first protective layer 221. The first wavelength band filter 230 is a wavelength-selective optical filter that transmits only part of a wavelength band of transmitted light by transmitting light of a specific wavelength band and blocking light of another specific wavelength band.

In some exemplary embodiments, the first wavelength band filter 230 may transmit light having a peak wavelength longer than the peak wavelength of the third color provided by the light source unit 20 and absorb light of the third color. For example, the first wavelength band filter 230 may be a color filter that transmits light in a wavelength band including the peak wavelength of the first color and/or the peak wavelength of the second color, and absorbs light in a wavelength band including the peak wavelength of the third color. The first color may be red having a peak wavelength in the range of about 610 nm to about 650 nm, and the second color may be green having a peak wavelength in the range of about 530 nm to about 570 nm. As a non-limiting example, the first wavelength band filter 230 may include a base resin and a colorant or dye that is dissolved in the base resin and absorbs light in a wavelength band including the peak wavelength of the third color.

The first wavelength band filter 230 may be made of an organic material having photosensitivity. The first wavelength band filter 230 may be disposed directly on the first protective layer 221 and may be integrally formed over the first pixel PXa and the second pixel PXb. However, the first wavelength band filter 230 may not be disposed in the third pixel PXc. An average thickness of the first wavelength band filter 230 may be about 0.5 micrometers (μm) to about 2 μm, e.g., about 0.5 μm to about 1.5 μm. When the thickness of the first wavelength band filter 230 is 0.5 μm or more, the first wavelength band filter 230 can fully absorb light of a specific wavelength band. When the thickness of the first wavelength band filter 230 is 2 μm or less, a step formed by the first wavelength band filter 230 can be minimized. In addition, a distance between the color conversion patterns 240a and 240b, which will be described later, and the light shielding member 215 can be minimized, thereby suppressing the color mixture defect.

Light of the third color provided from the light source unit 20 and incident on the color conversion patterns 240a and 240b may be transmitted through the color conversion patterns 240a and 240b without being color-converted by the color conversion patterns 240a and 240b, but may be absorbed by the first wavelength band filter 230. Thus, the purity of colors displayed by the first pixel PXa and the second pixel PXb can be improved, and the display quality of the display device 1 can be improved.

The color conversion patterns 240a and 240b may be disposed on the first wavelength band filter 230. Each of the color conversion patterns 240a and 240b can convert the color of transmitted light into a color different from that of incident light. That is, light may be converted into light of a specific wavelength band as it passes through each of the color conversion patterns 240a and 240b. In some exemplary embodiments, each of the color conversion patterns 240a and 240b may include a material, that is, a wavelength shift material 242a or 242b, that converts or shifts the peak wavelength of incident light to a specific peak wavelength.

In some exemplary embodiments, each of the color conversion patterns 240a and 240b may be a color filter that transmits only part of a wavelength band of transmitted light by transmitting light of a specific wavelength band of incident light and absorbing light of another specific wavelength band.

The color conversion patterns 240a and 240b include a first color conversion pattern 240a and a second color conversion pattern 240b. The first color conversion pattern 240a overlaps the first wavelength band filter 230 and is disposed in the first pixel PXa, and the second color conversion pattern 240b overlaps the first wavelength band filter 230 and is disposed in the second pixel PXb. Light that passes through the first color conversion pattern 240a may represent the first color, and light that passes through the second color conversion pattern 240b may represent the second color. In a cross-sectional view taken along the arrangement direction of the first pixel PXa, the second pixel PXb and the third pixel PXc constituting a basic unit, at least one edge portion of each of the first color conversion pattern 240a and/or the second color conversion pattern 240b may be higher than a central portion of the first color conversion pattern 240a and/or the second color conversion pattern 240b.

In some exemplary embodiments, the first color conversion pattern 240a may be disposed directly on the first wavelength band filter 230. The first color conversion pattern 240a may include a first base resin 241a and a first wavelength shift material 242a that is dispersed in the first base resin 241a and shifts the peak wavelength of incident light to the peak wavelength of the first color. In addition, the second color conversion pattern 240b may be disposed directly on the first wavelength band filter 230. The second color conversion pattern 240b may include a second base resin 241b and a second wavelength shift material 242b that is dispersed in the second base resin 241b and shifts the peak wavelength of incident light to the peak wavelength of the second color. The first base resin 241a and the second base resin 241b are not particularly limited as long as they are transparent light-transmitting resins. For example, the first base resin 241a and the second base resin 241b may be made of an organic material, such as an epoxy resin, an acrylic resin, etc.

The first wavelength shift material 242a may be a material that shifts the peak wavelength of incident light to the peak wavelength of the first color and then emits the light. The second wavelength shift material 242b may be a material that shifts the peak wavelength of incident light to the peak wavelength of the second color and then emits the light. Examples of the wavelength shift material may include at least one of a quantum dot, a quantum rod, and a fluorescent material. For example, the quantum dot may emit light of a specific color when an electron transitions from a conduction band to a valence band. The quantum dot material may have a core-shell structure. The core may be a semiconductor nanocrystalline material. For example, the core of the quantum dot may include, but is not limited to, silicon (Si) nanocrystals, group II-VI compound nanocrystals, and group III-V compound nanocrystals. As a non-limiting example, each of the first wavelength shift material 242a and the second wavelength shift material 242b may include a core made of any one of cadmium selenide (CdSe), cadmium telluride (CdTe), cadmium sulfide (CdS) and indium phosphide (InP), and an outer shell made of zinc sulfide (ZnS).

The size (e.g., grain size) of the first wavelength shift material 242a may be greater than that of the second wavelength shift material 242b. In a non-limiting example, the size of the first wavelength shift material 242a may be about 55 angstroms (A) to about 65 A, and the size of the second wavelength shift material 242b may be about 40 A to about 50 A. Light emitted from the first wavelength shift material 242a and light emitted from the second wavelength shift material 242b may be radiated in various directions regardless of an incident angle of incident light and may contribute to the improvement of lateral visibility of the first color and the second color represented by the display device 1. Light emitted from the first color conversion pattern 240a and the second color conversion pattern 240b toward the viewer side may be depolarized to become unpolarized light. As used herein, "unpolarized light" refers to light that is not composed only of polarization components in a specific direction. That is, light that is not polarized only in a specific direction. In other words, light that is composed of random polarization components. An example of unpolarized light is natural light.

Both of the first color conversion pattern 240a and the second color conversion pattern 240b adjacent to the first color conversion pattern 240a may overlap a portion of the light shielding member 215. The first color conversion pattern 240a and the second color conversion pattern 240b may be separated from each other on the light shielding member 215. In addition, a side surface of the first color conversion pattern 240a may be separated from an adjacent side surface of the second color conversion pattern 240b that faces the side surface of the first color conversion pattern 240a. Since the first color conversion pattern 240a and the second color conversion pattern 240b are physically separated from each other, it is possible to prevent (or reduce) light emitted from the first wavelength shift material 242a from travelling into the second color conversion pattern 240b and representing the first color in the second pixel PXb.

The light transmitting pattern 240c may be disposed on the first protective layer 221 in the third pixel PXc. The light transmitting pattern 240c can substantially transmit light without converting the color of the light. That is, light that passes through the light transmitting pattern 240c can represent the third color. The light transmitting pattern 240c may not overlap the first wavelength band filter 230. The light transmitting pattern 240c may include a third base resin 241c and light scattering particles 242c dispersed in the third base resin 241c.

The third base resin 241c may be a transparent light-transmitting resin. The first base resin 241a, the second base resin 241b, and the third base resin 241c may be made of the same or different materials. The light scattering particles 242c may be particles having a refractive index different from that of the third base resin 241c. The light scattering particles 242c are not particularly limited as long as they can scatter incident light. For example, the light scattering particles 242c may be metal oxide particles or organic particles. Examples of the metal oxide may include titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$). Examples of the organic material may include acrylic resin and urethane resin. The light scattering particles 242c scatter light of the third color emitted from the light source unit 20 and transmitting through the light transmitting pattern 240c in various directions regardless of the incident angle without converting the wavelength of the light, thereby improving the lateral visibility of the third color represented by the display device 1. Light emitted from the light transmitting pattern 240c toward the viewer side may be depolarized to become unpolarized. In some exemplary embodiments, the light emitting pattern 240c may be omitted.

Both of the light transmitting pattern 240c and the second color conversion pattern 240b adjacent to the light transmitting pattern 240c may overlap a portion of the light shielding member 215. The light transmitting pattern 240c and the second color conversion pattern 240b may be separated from each other on the light shielding member 215. In addition, a side surface of the light transmitting pattern 240c may be separated from an adjacent side surface of the second color conversion pattern 240b that faces the side surface of the light transmitting pattern 240c. Since the light transmitting pattern 240c and the second color conversion pattern 240b are physically separated from each other, it is possible to prevent (or reduce) light emitted from the second wavelength shift material 242b from travelling into the light transmitting pattern 240c and representing the third color in the third pixel PXc.

In some exemplary embodiments, a maximum thickness $t_{240c}$ of the light transmitting pattern 240c may be greater than a maximum thickness of each of the color conversion patterns 240a and 240b, for example, a maximum thickness $t_{240b}$ of the second color conversion pattern 240b. The maximum thickness $t_{240c}$ of the light transmitting pattern 240c denotes a maximum vertical distance from a bottom surface of the light transmitting pattern 240c to the top of the light transmitting pattern 240c, and the maximum thickness $t_{240b}$ of the second color conversion pattern 240b denotes a maximum vertical distance from a bottom surface of the second color conversion pattern 240b to the top surface of the central portion of the second color conversion pattern 240b. For example, the maximum thickness $t_{240c}$ of the light transmitting pattern 240c may be about 7 µm to about 8 µm, and the maximum thickness $t_{240b}$ of the second color conversion pattern 240b may be about 6 µm to about 7 µm.

In some exemplary embodiments in which at least one edge portion of the second color conversion pattern 240b is higher than the central portion in a cross-sectional view taken along the arrangement direction of the first pixel PXa, the second pixel PXb, and the third pixel PXc constituting a basic unit, a step formed by the central portion and the edge portion, that is, a tapered step $t_s$ may be about 0.3 µm or less, but greater than 0 µm.

A second wavelength band filter 250 may be disposed on the first color conversion pattern 240a, the second color conversion pattern 240b, and the light transmitting pattern 240c. The second wavelength band filter 250 is a wavelength-selective optical filter that transmits only part of a wavelength band of transmitted light by transmitting light of a specific wavelength band and blocking light of another specific wavelength band.

In some exemplary embodiments, the second wavelength band filter 250 may reflect light having a peak wavelength longer than the peak wavelength of the third color provided by the light source unit 20 and transmit light of the third color. For example, the second wavelength band filter 250 may be a wavelength-selective transmission/reflection layer that reflects light of a wavelength band including the peak wavelength of the first color and the peak wavelength of the second color and transmits light of a wavelength band including the peak wavelength of the third color.

The second wavelength band filter 250 may include one or more layers made of an inorganic material. For example, the second wavelength band filter 250 may include a plurality of low refraction layers 251 and a plurality of high refraction layers 252 stacked alternately. As used herein, "low refraction layer" refers to a layer having a relatively low refractive index as compared with an adjacent layer, and "high refraction layer" refers to a layer having a relatively high refractive index as compared with an adjacent layer. The transmission wavelength band and the reflection wavelength band of the second wavelength band filter 250 can be controlled by, but is not limited to, the materials of the low refraction layers 251 and the high refraction layers 252, respective thicknesses of the low refraction layers 251 and the high refraction layers 252, a difference between the thicknesses, respective refractive indices of the low refraction layers 251 and the high refraction layers 252, a difference between the refractive indices.

In some exemplary embodiments, the second wavelength band filter 250 may include a silicon nitride ($SiN_x$) layer and a silicon oxide ($SiO_x$) layer stacked alternately with each other. In some exemplary embodiments, the low refraction layers 251 may be made of an oxide of silicon, such as silicon oxide ($SiO_x$), and the high refraction layers 252 may be made of metal oxide, such as titanium oxide ($TiO_x$), tantalum oxide ($TaO_x$), hafnium oxide ($HfO_x$) or zirconium oxide ($ZrO_x$). In FIG. 2, a case where the second wavelength band filter 250 includes two low refraction layers 251 and two high refraction layers 252 is illustrated as an example; however, exemplary embodiments are not limited to this case. The second wavelength band filter 250 may be disposed directly on the first color conversion pattern 240a, the second color conversion pattern 240b, and the light transmitting pattern 240c without distinction between the pixels PXa through PXc. The second wavelength band filter 250 may be formed to a substantially constant thickness along outer surfaces of the first color conversion pattern 240a, the second color conversion pattern 240b and the light transmission pattern 240c. An average thickness of the second wavelength band filter 250 may be about 0.5 µm to about 2 µm, e.g., about 1 µm.

Of light emitted in various directions from the first wavelength shift material 242a and the second wavelength shift material 242b, light emitted toward the second wavelength band filter 250 may be reflected by the second wavelength band filter 250 toward the second insulating substrate 210, that is, toward the viewer side, so that the reflected light can contribute to the color display. This can increase light utilization efficiency and enable the display device 1 to display a clearer (or more pure) color. In addition, of light provided by the light source unit 20, the second wavelength band filter 250 may transmit light having the peak wavelength of the third color while blocking light having a peak wavelength longer than that of the third color. As such, the color purity of the light provided by the light source unit 20 can be further improved.

A first overcoat layer 261 may be disposed on the second wavelength band filter 250. The first overcoat layer 261 may be a planarization layer that minimizes (or reduces) steps of a plurality of components stacked on the second insulating substrate 210. In some exemplary embodiments, the first overcoat layer 261 may be disposed directly on the second wavelength band filter 250 without distinction between the pixels PXa through PXc. The first overcoat layer 261 may be made of an organic material having planarization characteristics. For example, the first overcoat layer 261 may be made of a thermosetting resin. Examples of the organic material that forms the first overcoat layer 261 may include cardo resin, polyimide resin, acrylic resin, siloxane resin, and silsesquioxane resin.

A barrier layer 270 made of an inorganic material may be disposed on the first overcoat layer 261. The barrier layer 270 may include one or more layers made of an insulating inorganic material. Examples of the inorganic material that forms the barrier layer 270 may include silicon nitride, silicon oxide, silicon nitride oxide, and silicon oxynitride. In some exemplary embodiments, the barrier layer 270 may be disposed directly on the first overcoat layer 261 without distinction between the pixels PXa through PXc. In addition, the barrier layer 270 may be in contact with the entire surface of the first overcoat layer 261 in one pixel (e.g., the first pixel PXa) without a portion separated from the first overcoat layer 261. An interface between the first overcoat layer 261 and the barrier layer 270 may have grooves. The grooves may be irregular. The barrier layer 270 may be formed to a substantially constant thickness along a surface (e.g., a lower surface in the drawings) of the first overcoat layer 261. An average thickness $t_{270}$ of the barrier layer 270 may be about 0.05 µm to about 0.2 µm, e.g., about 0.1 µm.

The barrier layer 270 can prevent (or reduce) outgassing of a gas generated inside the first overcoat layer 261 and the diffusion of a residual solvent in the first overcoat layer 261 during a process of curing a second overcoat layer 262, which will be described later. In this manner, the degree of planarization of the second overcoat layer 280 can be maximized or at increased. In addition, since components having electro-optical functions, the second polarizer 280, and the common electrode 290 can be accurately placed at desired positions on the second overcoat layer 262, the display quality of the display device 1 can be improved.

The second overcoat layer 262 may be disposed on the barrier layer 270. The second overcoat layer 262 may be a planarization layer that planarizes steps of a plurality of components stacked on the second insulating substrate 210. In some exemplary embodiments, the second overcoat layer 262 may be disposed directly on the barrier layer 270 without distinction between the pixels PXa through PXc. In addition, the second overcoat layer 262 may be in contact with the entire (or substantially entire) surface of the barrier layer 270 in one pixel (e.g., the first pixel PXa) without a portion separated from the barrier layer 270. The second overcoat layer 262 may be made of an organic material having planarization characteristics. For example, the second overcoat layer 262 may be made of a thermosetting resin or a photocurable resin. Examples of the organic material that forms the second overcoat layer 262 may include cardo resin, polyimide resin, acrylic resin, siloxane resin, and silsesquioxane resin.

In some exemplary embodiments, the second overcoat layer 262 may be made of an organic material different from that of the first overcoat layer 261. In this case, the first overcoat layer 261 and the second overcoat layer 262 can have sufficient planarization characteristics, and reflow of the first overcoat layer 261 and the second overcoat layer 262 after being cured can be minimized (or reduced). That is, overcoat layers including the first overcoat layer 261 and the second overcoat layer 262 may be given a complex function having both a planarization characteristic and a reflow suppression characteristic. In addition, if the second overcoat layer 262 is made of photocurable resin, it is possible to reduce the stress generated at the interface between the first overcoat layer 261 and the barrier layer 270 during the process of curing the second overcoat layer 262.

A thickness $t_{262}$ of the second overcoat layer 262, for example, a maximum thickness of the second overcoat layer 262, may be smaller than a minimum thickness $t_{261}$ of the first overcoat layer 261. The minimum thickness $t_{261}$ of the first overcoat layer 261 refers to a shortest vertical distance from the top surface (bottom surface in the drawings) of the central portion of the first color conversion pattern 240a or the second color conversion pattern 240b to a surface of the first overcoat layer 261. For example, the minimum thickness $t_{261}$ of the first overcoat layer 261 may be about 3 μm. In addition, the maximum thickness $t_{262}$ of the second overcoat layer 262 may be about 1.5 μm or about 1 μm. If the minimum thickness $t_{261}$ of the first overcoat layer 261 is 3 μm or more and the maximum thickness $t_{262}$ of the second overcoat layer 262 is 1.5 μm or less, stress generated between the first overcoat layer 261 and the second overcoat layer 262 can be reduced, and an excellent degree of planarization can be ensured. In addition, the thickness $t_{262}$ of the second overcoat layer 262, for example, a minimum thickness of the second overcoat layer 262 may be greater than the thickness of the barrier layer 270, for example, a maximum thickness of the barrier layer 270. The maximum thickness of the barrier layer 270 may be about 0.2 μm.

A second protective layer 222 may be disposed on the second overcoat layer 262. The second protective layer 222 may be disposed directly on the second overcoat layer 262 without distinction between the pixels PXa through PXc. The second protective layer 222 may be made of an insulating inorganic material, such as silicon nitride or silicon oxide. The second protective layer 222 can prevent (or reduce) the second overcoat layer 262 from being damaged in a process of forming the second polarizer 280 to be described later. In addition, the second protective layer 222 can improve the reliability of the display device 1 by improving the adhesion of the second polarizer 280 and preventing (or reducing) damage or corrosion of the second polarizer 280 due to penetration of air or moisture. In some exemplary embodiments, the second protective layer 222 may be omitted.

The second polarizer 280 may be disposed on the second protective layer 222. The second polarizer 280 may perform an optical shutter function together with the first polarizer 180 and the liquid crystal layer 300 to control an amount of light that transmits through each of the pixels PXa through PXc. In some exemplary embodiments, the second polarizer 280 may be a reflective polarizer including a wire grid pattern disposed directly on the second protective layer 222. The wire grid pattern refers to a plurality of linear patterns extending parallel to each other and separated from each other. The reflective polarizer may give polarity to transmitted light by reflecting a polarization component parallel to the reflection axis and transmitting a polarization component parallel to the transmission axis. The reflection axis may be in a direction substantially parallel to the extending direction of the wire grid pattern, and the transmission axis may be in a direction intersecting the extending direction of the wire grid pattern.

The wire grid pattern of the second polarizer 280 may be made of a conductive material. Examples of the conductive material that can form the wire grid pattern may include aluminum (Al), silver (Ag), gold (Au), copper (Cu), titanium (Ti), molybdenum (Mo), nickel (Ni), and alloys of these materials. In some exemplary embodiments, the wire grid pattern may be a stacked structure of a plurality of wire grid pattern layers made of a conductive material.

A capping layer 223 may be disposed on the second polarizer 280. The capping layer 223 may be disposed directly on the second polarizer 280 to cover and protect the second polarizer 280. The capping layer 223 can prevent (or reduce) the second polarizer 280 from being damaged or corroded by penetration of air or moisture, and can planarize an upper surface (a lower surface in the drawings) of the second polarizer 280. The capping layer 223 may be made of an inorganic insulating material, such as silicon nitride or silicon oxide.

The common electrode 290 may be disposed on the capping layer 223. The common electrode 290 may be integrally formed without distinction between the pixels PXa through PXc, and a common voltage may be applied to the common electrode 290. In some exemplary embodiments, the common electrode 290 may be disposed directly on the capping layer 223 and may be a transparent electrode. The second liquid crystal alignment layer 295 may be disposed on the common electrode 290. The second liquid crystal alignment layer 295 can induce an initial alignment of the liquid crystals 301 in the adjacent liquid crystal layer 300. The second liquid crystal alignment layer 295 may include a polymer organic material that is the same as or different from that of the first liquid crystal alignment layer 195.

Figure 3:
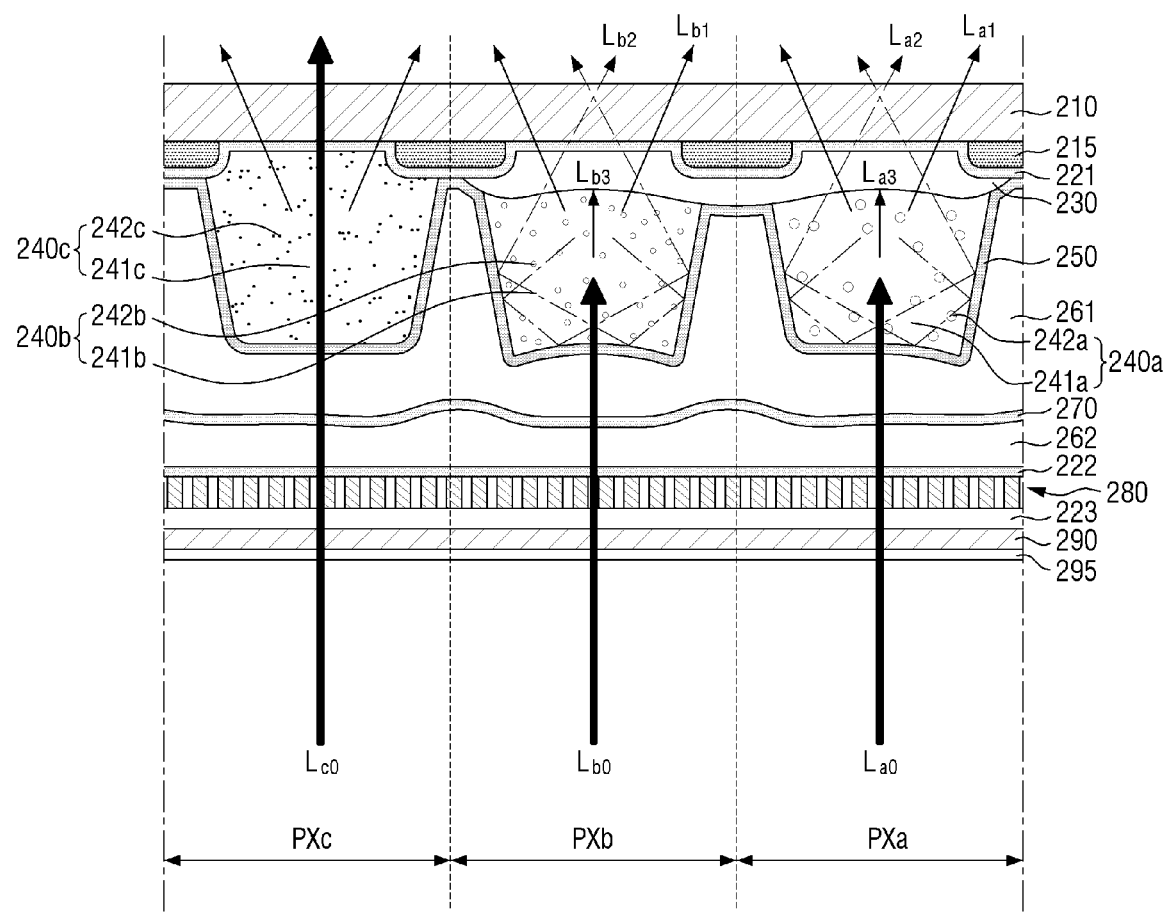
FIG. 3 illustrates light s in the display device of FIG. I according to some exemplary embodiments.

Hereinafter, a process in which the display device 1 realizes a color display will be described in detail with reference to FIG. 3. FIG. 3 illustrate light paths in the display device of FIG. 1 according to some exemplary embodiments.

Referring to FIGS. 1 through 3, the light source unit 20 may provide light of the third color to the display panel 10. In some exemplary embodiments, the light source unit 20 may provide blue light having a peak wavelength in the range of about 430 nm to about 470 nm to the display panel 10.

Of the light provided from the light source unit 20, at least part of light traveling in a direction substantially perpendicular to the surface of the first insulating substrate 110 or the second insulating substrate 210 may be incident on the first pixel PXa of the display panel 10. As used herein, "light traveling in the direction perpendicular to the surface of the insulating substrate" denotes straight light passing through the display panel 10. When the display panel 10 is a curved display panel, the "light traveling in the direction perpendicular to the surface of the insulating substrate" denotes light passing through a certain point on the surface of the insulating substrate and traveling in a normal direction to the certain point.

Light $L_{a0}$ incident on the first pixel PXa may sequentially pass through the first polarizer 180, the first insulating substrate 110, the liquid crystal layer 300, the capping layer 223, the second polarizer 280, the second protective layer 222 made of an inorganic material, the second overcoat layer 262 made of an organic material, the barrier layer 270 made of an inorganic material, the first overcoat layer 261 made of an organic material, the second wavelength band filter 250 including one or more layers made of an inorganic material, the first color conversion pattern 240a including the first wavelength shift material 242a, the first wavelength band filter 230 made of an organic material, the first protective layer 221 made of an inorganic material, and the second insulating substrate 210.

The light $L_{a0}$ provided from the light source unit 20 and incident on the first pixel PXa may maintain the third color after passing through the first polarizer 180, the first insulating substrate 110, the liquid crystal layer 300, the capping layer 223, the second polarizer 280, the second protective layer 222, the second overcoat layer 262, the barrier layer 270, the first overcoat layer 261, and the second wavelength band filter 250.

The peak wavelength of the light that passes through the second wavelength band filter 250 (i.e., the peak wavelength of the third color) may be shifted to the peak wavelength of the first color by the first wavelength shift material 242a of the first color conversion pattern 240a. Then, the light whose wavelength has been converted may be emitted in various directions.

Of the light emitted from the first wavelength shift material 242a, light $L_{a1}$ emitted toward the second insulating substrate 210 (toward an upper side in the drawing) may pass through the first wavelength band filter 230 as it is and contribute to the display of the first color by the first pixel PXa. For example, the first color may be red having a peak wavelength in the range of about 610 nm to about 650 nm. In addition, of the light emitted from the first wavelength shift material 242a, light $L_{a2}$ emitted toward the second wavelength band filter 250 (toward a lower side in the drawing) may be reflected toward the second insulating substrate 210, that is, toward the viewer side by the second wavelength band filter 250, which reflects light of a wavelength band including the peak wavelength of the first color. The reflected light $L_{a2}$ may contribute to the display of the first color by the first pixel PXa.

Furthermore, of the light $L_{a0}$ provided from the light source unit 20 and incident on the first pixel PXa, light $L_{a3}$ of the third color that passes through the first base resin 241a without being color-converted by the first wavelength shift material 242a of the first color conversion pattern 240a may be absorbed by the first wavelength band filter 230 that absorbs light of a wavelength band including the peak wavelength of the third color. Thus, the light $L_{a3}$ of the third color may not be visible in the first pixel PXa.

Likewise, of the light provided from the light source unit 20, at least part of light traveling in the direction substantially perpendicular to the surface of the first insulating substrate 110 or the second insulating substrate 210 may be incident on the second pixel PXb of the display panel 10. Light $L_{b0}$ incident on the second pixel PXb may sequentially pass through the first polarizer 180, the first insulating substrate 110, the liquid crystal layer 300, the capping layer 223, the second polarizer 280, the second protective layer 222, the second overcoat layer 262, the barrier layer 270, the first overcoat layer 261, the second wavelength band filter 250, the second color conversion pattern 240b including the second wavelength shift material 242b, the first wavelength band filter 230, the first protective layer 221, and the second insulation substrate 210.

Specifically, the light $L_{b0}$ provided from the light source unit 20 and incident on the second pixel PXb may maintain the third color after passing through the first polarizer 180, the first insulating substrate 110, the liquid crystal layer 300, the capping layer 223, the second polarizer 280, the second protective layer 222, the second overcoat layer 262, the barrier layer 270, the first overcoat layer 261, and the second wavelength band filter 250.

The peak wavelength of the light that passes through the second wavelength band filter 250 may be shifted to the peak wavelength of the second color by the second wavelength shift material 242b of the second color conversion pattern 240b. Then, the light whose wavelength has been converted may be emitted in various directions. Light $L_{b1}$ and light $L_{b2}$ emitted by the second wavelength shift material 242b may pass through the first wavelength band filter 230 as they are and contribute to the display of the second color by the second pixel PXb. For example, the second color may be green having a peak wavelength in the range of about 530 nm to about 650 nm. In addition, of the light $L_{b0}$ provided from the light source unit 20 and incident on the second pixel PXb, light $L_{b3}$ of the third color that passes through the second base resin 241b without being color-converted by the second wavelength shift material 242b of the second color conversion pattern 240b may be absorbed by the first wavelength band filter 230. Thus, the light $L_{b3}$ of the third color may not be visible in the second pixel PXb.

Of the light provided from the light source unit 20, at least part of light traveling in the direction substantially perpendicular to the surface of the first insulating substrate 110 or the second insulating substrate 210 may be incident on the third pixel PXc of the display panel 10. Light $L_{c0}$ incident on the third pixel PXc may sequentially pass through the first polarizer 180, the first insulating substrate 110, the liquid crystal layer 300, the capping layer 223, the second polarizer 280, the second protective layer 222, the second overcoat layer 262, the barrier layer 270, the first overcoat layer 261, the second wavelength band filter 250, the light transmitting pattern 240c, the first protective layer 221, and the second insulating substrate 210.

Specifically, the light $L_{c0}$ provided from the light source unit 20 and incident on the third pixel PXc may pass through the light transmitting pattern 240c without substantial color conversion and contribute to the display of the third color by the third pixel PXc. In addition, the light scattering particles 242c of the light transmitting pattern 240c can further improve lateral visibility by scattering light transmitted through the light transmitting pattern 240c.

Hereinafter, display devices according to various exemplary embodiments will be described. To avoid obscuring exemplary embodiments described herein, a description of components identical (or substantially identical) to those previously described in association with the display device 1 will be omitted.

Figure 4:
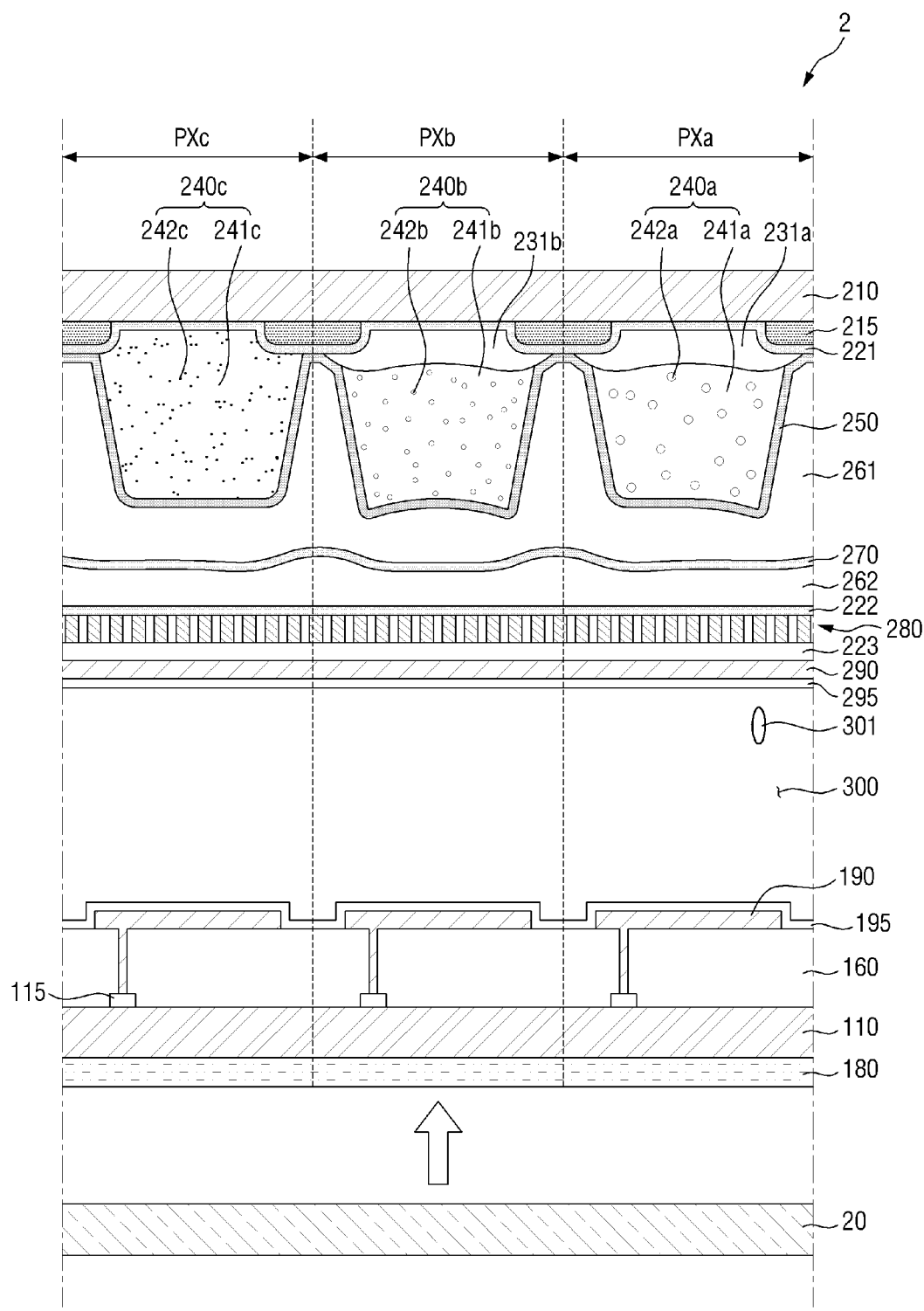
FIG. 4 is a cross-sectional view of pixels of a display device according to some exemplary embodiments.

FIG. 4 is a cross-sectional view of pixels of a display device according to some exemplary embodiments.

Referring to FIG. 4, the display device 2 is different from the display device 1 in that a first wavelength band filter includes a $(1-1)^{th}$ wavelength band filter 231a and a $(1-2)^{th}$ wavelength band filter 231b. The $(1-1)^{th}$ wavelength band filter 231a is disposed in the first pixel PXa and the $(1-2)^{th}$ wavelength band filter 231b is disposed in the second pixel PXb.

Each of the $(1-1)^{th}$ wavelength band filter 231a and the $(1-2)^{th}$ wavelength band filter 231b may be a wavelength-selective optical filter that transmits only part of a wavelength band of transmitted light by transmitting light of a specific wavelength band and blocking light of another specific wavelength band. The $(1-1)^{th}$ wavelength band filter 231a and the $(1-2)^{th}$ wavelength band filter 231b may all be made of an organic material.

In some exemplary embodiments, the $(1-1)^{th}$ wavelength band filter 231a may be a color filter that transmits light of a wavelength band including a peak wavelength of a first color and absorbs light of a wavelength band including a peak wavelength of a second color and a peak wavelength of a third color. In addition, the $(1-2)^{th}$ wavelength band filter 231b may be a color filter that transmits light of a wavelength band including the peak wavelength of the second color and absorbs light of a wavelength band including the peak wavelength of the first color and the peak wavelength of the third color. The first color may be red having a peak wavelength in the range of about 610 nm to about 650 nm, and the second color may be green having a peak wavelength in the range of about 530 nm to about 570 nm.

The $(1-1)^{th}$ wavelength band filter 231a and the $(1-2)^{th}$ wavelength band filter 231b may be separated (or spaced apart) from each other. In addition, a first color conversion pattern 240a may be disposed on the $(1-1)^{th}$ wavelength band filter 231a, and a second color conversion pattern 240b may be disposed on the (1-2)$^{th}$ wavelength band filter 231b. The (1-1)$^{th}$ wavelength band filter 231a may not overlap the second color conversion pattern 240b or the light transmitting pattern 240c. The (1-2)$^{th}$ wavelength band filter 231b may not overlap the first color conversion pattern 240a or the light transmitting pattern 240c.

Figure 5:
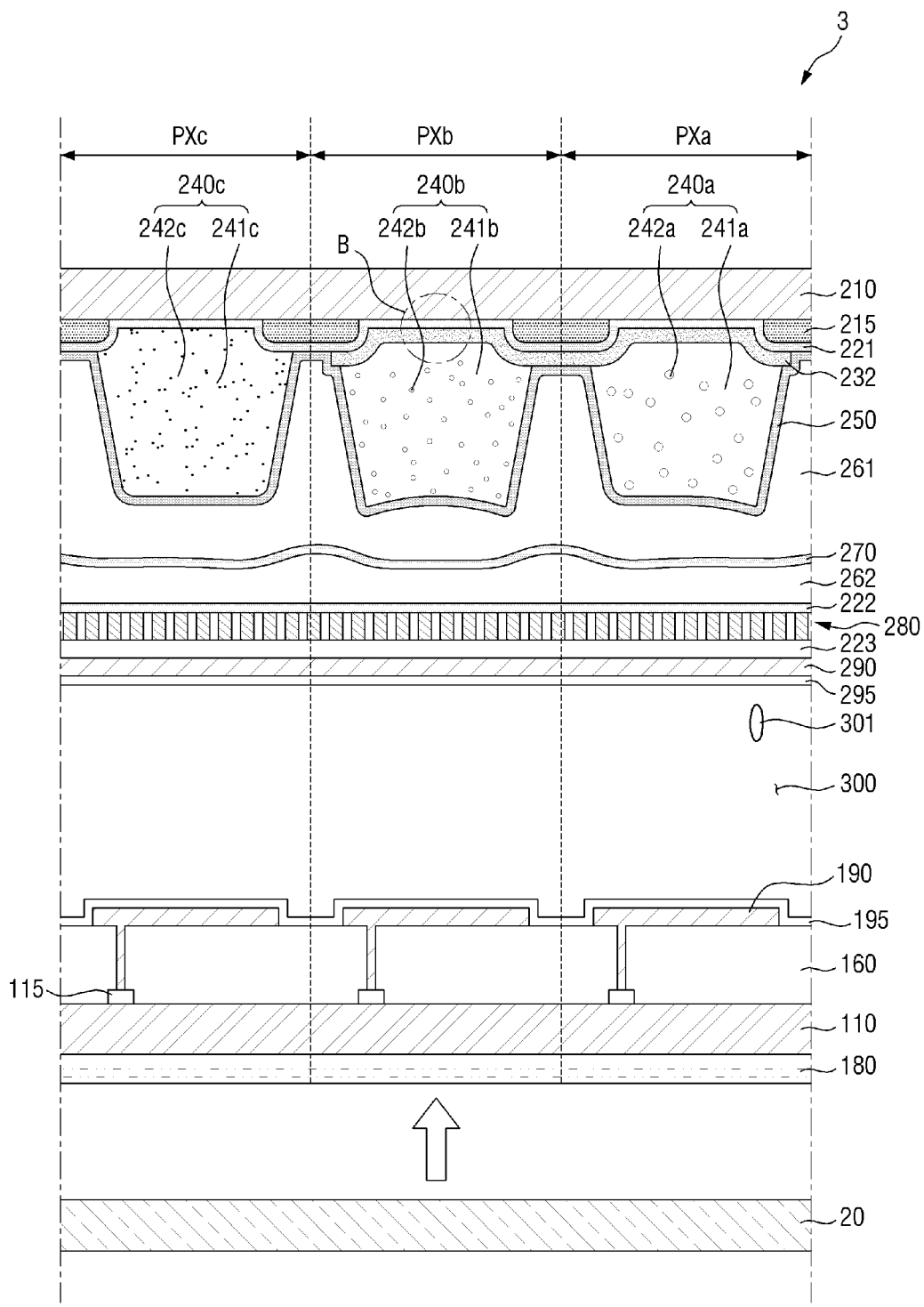
FIG. 5 is a cross-sectional view of pixels of a display device according to some exemplary embodiments.
Figure 6:
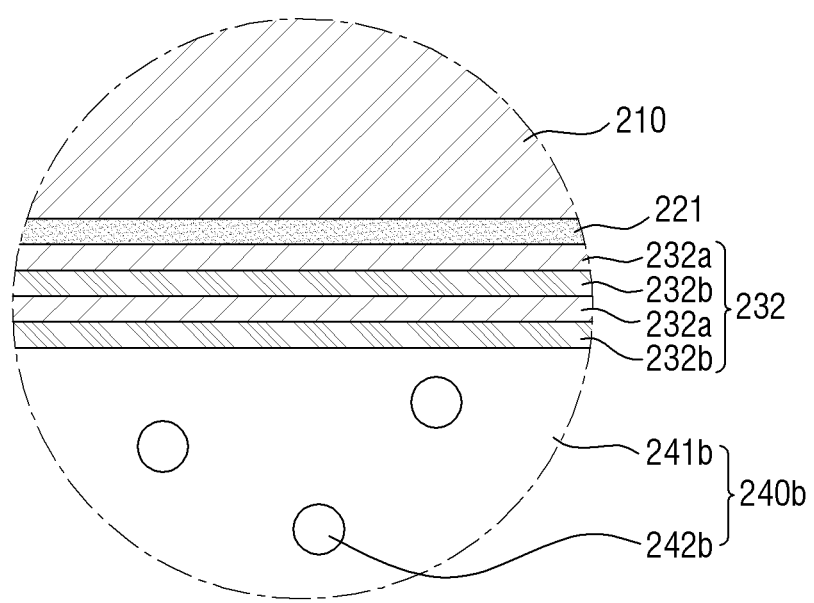
FIG. 6 is an enlarged cross-sectional view of area B in FIG. 5 according to some exemplary embodiments.
Figure 7:
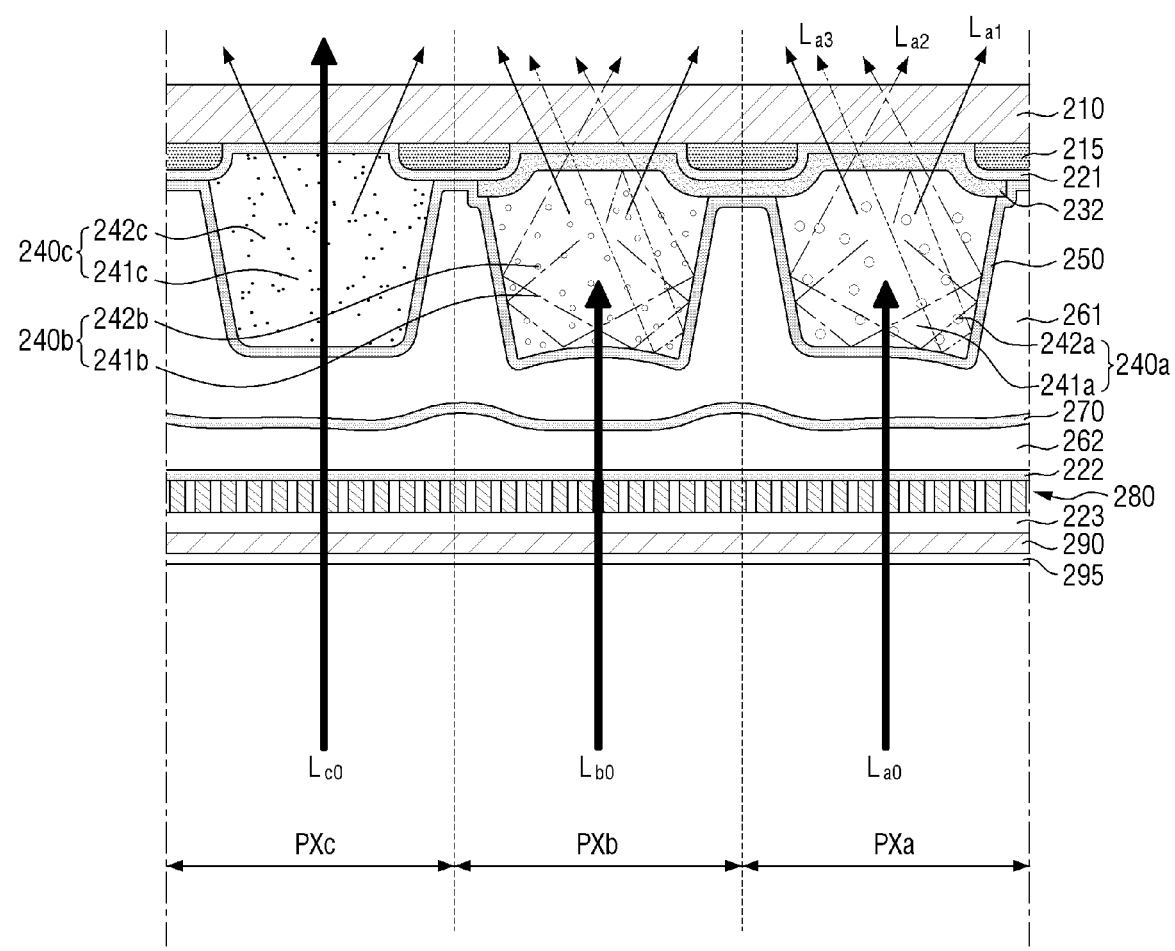
FIG. 7 illustrates light s in the display device of FIG. 5 according to some exemplary embodiments.

FIG. 5 is a cross-sectional view of pixels of a display device according to some exemplary embodiments. FIG. 6 is an enlarged cross-sectional view of area B in FIG. 5 according to some exemplary embodiments. FIG. 7 illustrates light paths in the display device of FIG. 5 according to some exemplary embodiments.

Referring to FIGS. 5 through 7, the display device 3 is different from the display device 1 in that a first wavelength band filter 232 includes one or more layers made of an inorganic material.

In some exemplary embodiments, the first wavelength band filter 232 is a wavelength-selective optical filter that transmits only part of a wavelength band of transmitted light by transmitting light of a specific wavelength band and blocking light of another specific wavelength band.

In some exemplary embodiments, the first wavelength band filter 232 may transmit light having a peak wavelength longer than a peak wavelength of a third color provided by the light source unit 20 and reflect light of the third color. For example, the first wavelength band filter 232 may be a wavelength-selective transmission/reflection layer that transmits light of a wavelength band including a peak wavelength of a first color and a peak wavelength of a second color, and reflects light of a wavelength band including the peak wavelength of the third color.

The first wavelength band filter 232 may include one or more layers made of an inorganic material. For example, the first wavelength band filter 232 may include a plurality of low refraction layers 232a and a plurality of high refraction layers 232b stacked alternately. The transmission wavelength band and the reflection wavelength band of the first wavelength band filter 232 can be controlled by, but not limited to, the materials of the low refraction layers 232a and the high refraction layers 232b, respective thicknesses of the low refraction layers 232a and the high refraction layers 232b, a difference between the thicknesses of the low refraction layers 232a and the high refraction layers 232b, the respective refractive indices of the low refraction layers 232a and the high refraction layers 232b, and a difference between the refractive indices of the low refraction layers 232a and the high refraction layers 232b.

In some exemplary embodiments, the first wavelength band filter 232 may include a silicon nitride (SiN$_x$) layer and a silicon oxide (SiO$_x$) layer stacked alternately with each other. In some exemplary embodiments, the low refraction layers 232a may be made of an oxide of silicon, such as silicon oxide (SiO$_x$), and the high refraction layers 232b may be made of metal oxide, such as titanium oxide (TiO$_x$), tantalum oxide (TaO$_x$), hafnium oxide (HfO$_x$), or zirconium oxide (ZrO$_x$). The first wavelength band filter 232 may be disposed directly on a first protective layer 221 and integrally formed over a first pixel PXa and a second pixel PXb. However, the first wavelength band filter 232 may not be disposed in a third pixel PXc. The first wavelength band filter 232 may be formed to a substantially constant thickness along a surface of the first protective layer 221.

Of light provided from the light source unit 20, at least part of light traveling in a direction substantially perpendicular to a surface of the first insulating substrate 110 or the second insulating substrate 210 may be incident on the first pixel PXa or the second pixel PXb.

For example, light L$_{a0}$ incident on the first pixel PXa may sequentially pass through a first polarizer 180, the first insulating substrate 110, a liquid crystal layer 300, a capping layer 223, a second polarizer 280, a second protective layer 222 made of an inorganic material, a second overcoat layer 262 made of an organic material, a barrier layer 270 made of an inorganic material, a first overcoat layer 261 made of an organic material, a second wavelength band filter 250 including one or more layers made of an inorganic material, a first color conversion pattern 240a including a first wavelength shift material 242a, the first wavelength band filter 232 including one or more layers made of an inorganic material, the first protective layer 221 made of an inorganic material, and the second insulating substrate 210. In this manner, the peak wavelength (i.e., the peak wavelength of the third color) of the light L$_{a0}$ provided from the light source unit 20 and incident on the first pixel PXa may be shifted to the peak wavelength of the first color by the first wavelength shift material 242a of the first color conversion pattern 240a. Then, the light L$_{a0}$ whose wavelength has been converted may be emitted in various directions. Light L$_{a1}$ and light L$_{a2}$ emitted by the first wavelength shift material 242a may pass through the first wavelength band filter 232 as they are and contribute to the display of the first color by the first pixel PXa.

In addition, of the light L$_{a0}$ provided from the light source unit 20 and incident on the first pixel PXa, light L$_{a3}$ of the third color that passes through a first base resin 241a without being color-converted by the first wavelength shift material 242a of the first color conversion pattern 240a may be reflected by the first wavelength band filter 232 toward the first insulation substrate 110 (toward a lower side in the drawings). As the light L$_{a3}$ of the third color reflected by the first wavelength band filter 232 travels toward the first insulating substrate 110, the peak wavelength of the reflected light L$_{a3}$ may be shifted to the peak wavelength of the first color by the first wavelength shift material 242a. Then, the light L$_{a3}$ whose wavelength has been shifted may be emitted from the first wavelength shift material 242a. The light L$_{a3}$ emitted from the first wavelength shift material 242a may be reflected toward the second insulating substrate 210, that is, toward the viewer side by the second wavelength band filter 250, which reflects light of a wavelength band including the peak wavelength of the first color. The reflected light L$_{a3}$ may contribute to the display of the first color by the first pixel PXa.

Figure 8:
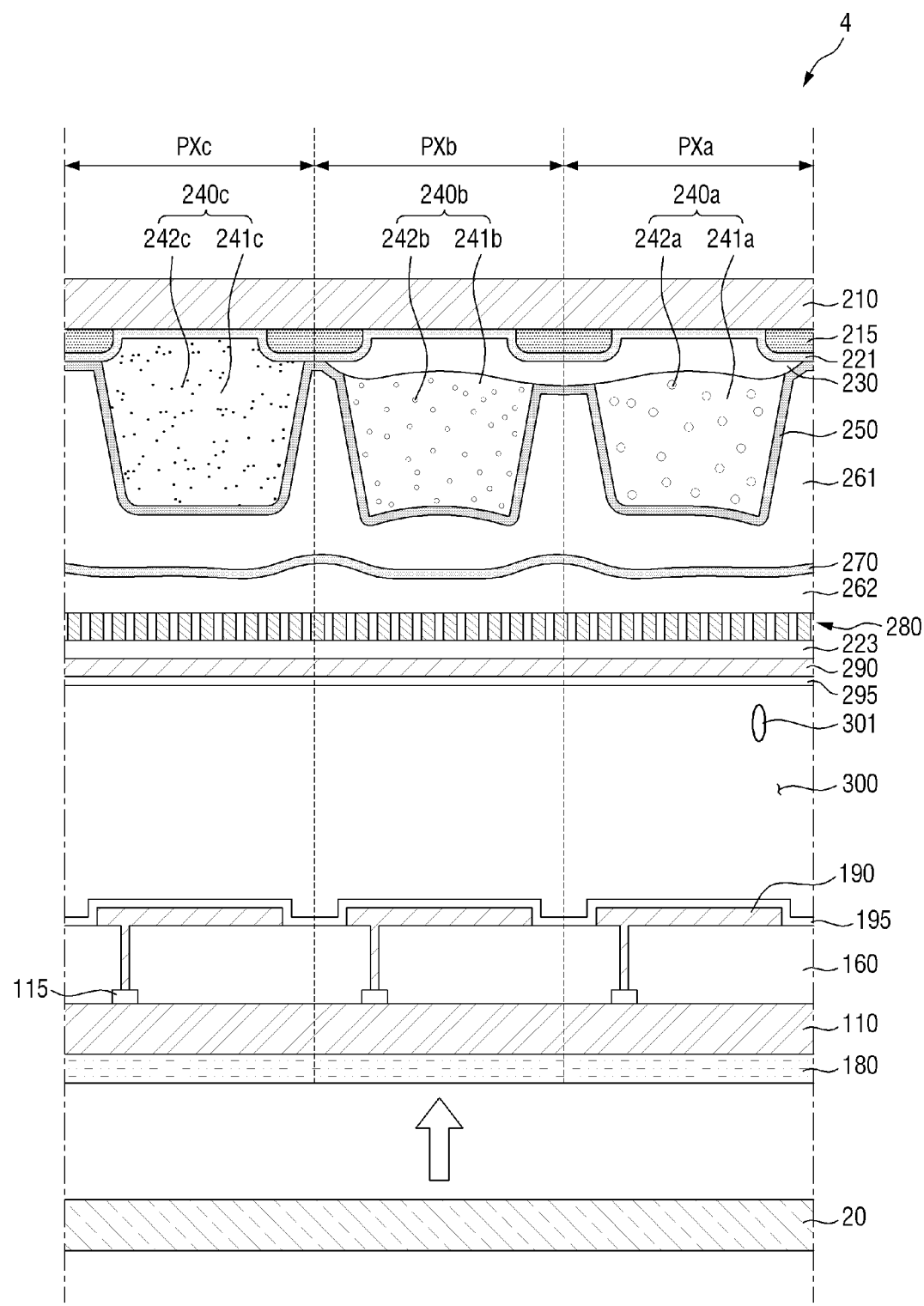
FIG. 8 is a cross-sectional view of pixels of a display device according to some exemplary embodiments.

FIG. 8 is a cross-sectional view of pixels of a display device according to some exemplary embodiments.

Referring to FIG. 8, the display device 4 is different from the display device 1 in that a second protective layer is omitted. In this manner, a second polarizer 280 may be disposed directly on a second overcoat layer 262. In some exemplary embodiments, the second polarizer 280 may be a reflective polarizer including a wire grid pattern disposed directly on the second overcoat layer 262.

Figure 9:
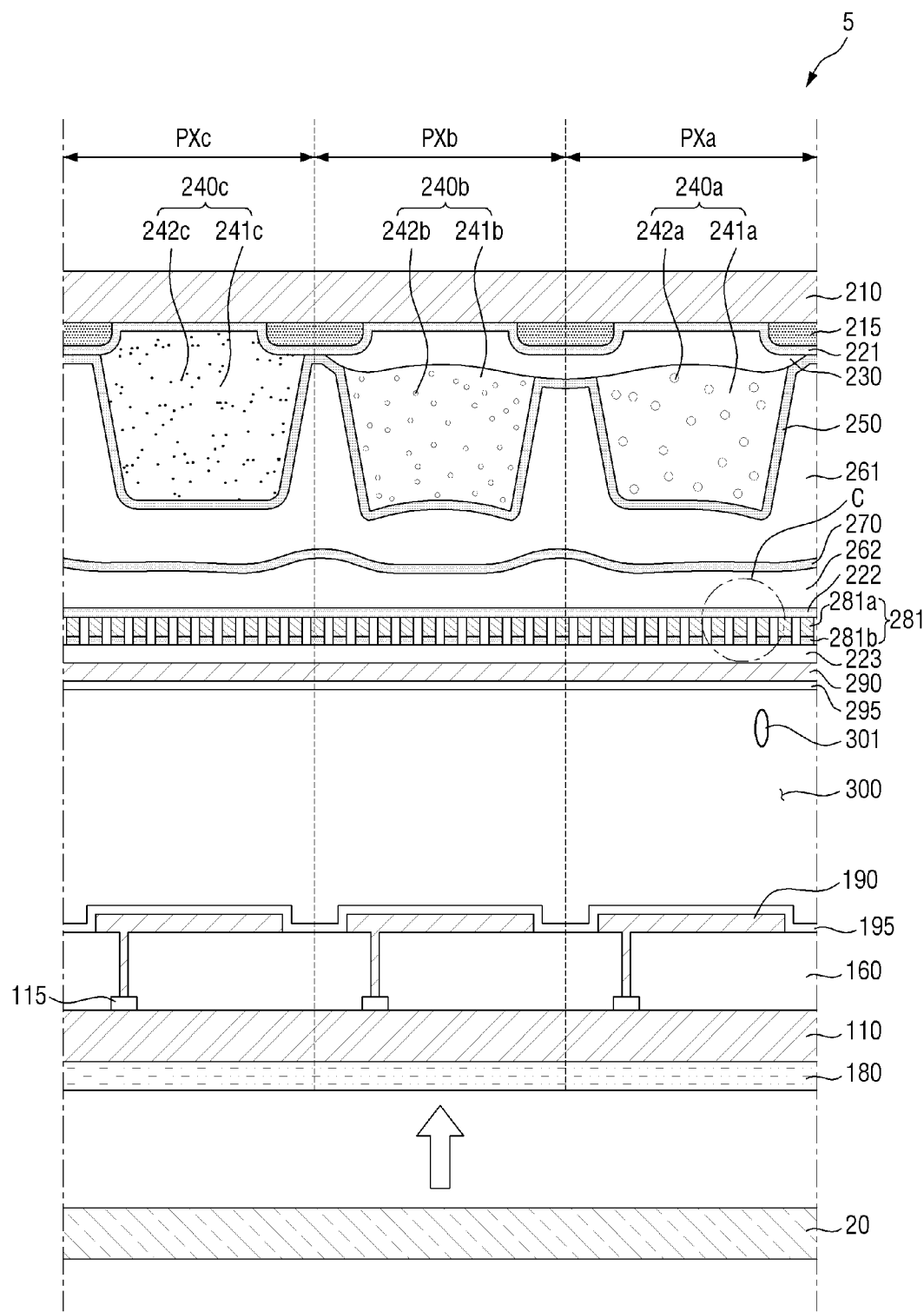

FIG. 9 is a cross-sectional view of pixels of a display device according to some exemplary embodiments. FIG. 10 is an enlarged view of area C in 9 according to some exemplary embodiments.

Referring to FIGS. 9 and 10, the display device 5 is different from the display device 1 in that a wire grid pattern of a second polarizer 281 includes a first wire grid pattern layer 281a made of a conductive material and a second wire grid pattern layer 281b made of an insulating material.

In some exemplary embodiments, the first wire grid pattern layer 281a may be disposed directly on a second protective layer 222. Examples of the conductive material that can form the first wire grid pattern layer 281a may include aluminum (Al), silver (Ag), gold (Au), copper (Cu), titanium (Ti), molybdenum (Ni), and alloys of these materials. In some exemplary embodiments, the first wire grid pattern layer 281a may be a stacked structure of a plurality of pattern layers made of a conductive material.

In addition, the second wire grid pattern layer 281b may be disposed directly on the first wire grid pattern layer 281a. The second wire grid pattern layer 281b may have a pattern shape corresponding to that of the first wire grid pattern layer 281a. A height of the second wire grid pattern layer 281b may be, but is not limited to, smaller than that of the first wire grid pattern layer 281a. Examples of the insulating material that can form the second wire grid pattern layer 281b may include silicon nitride and silicon oxide. In some exemplary embodiments, the second wire grid pattern layer 281b may be a stacked structure of a plurality of pattern layers made of an insulating material.

A capping layer 223 may be disposed on the second wire grid pattern layer 281b. The capping layer 223 may be disposed directly on the second polarizer 281, e.g., on the second wire grid pattern layer 281b made of an insulating material to cover and protect the second polarizer 281.

FIGS. 11, 12, 13, 14, 15, and 16 are cross-sectional views of a display device at various stages of manufacture according to some exemplary embodiments. Accordingly, a method of manufacturing a display device will be described in association with FIGS. 11 to 16.

Figure 11:
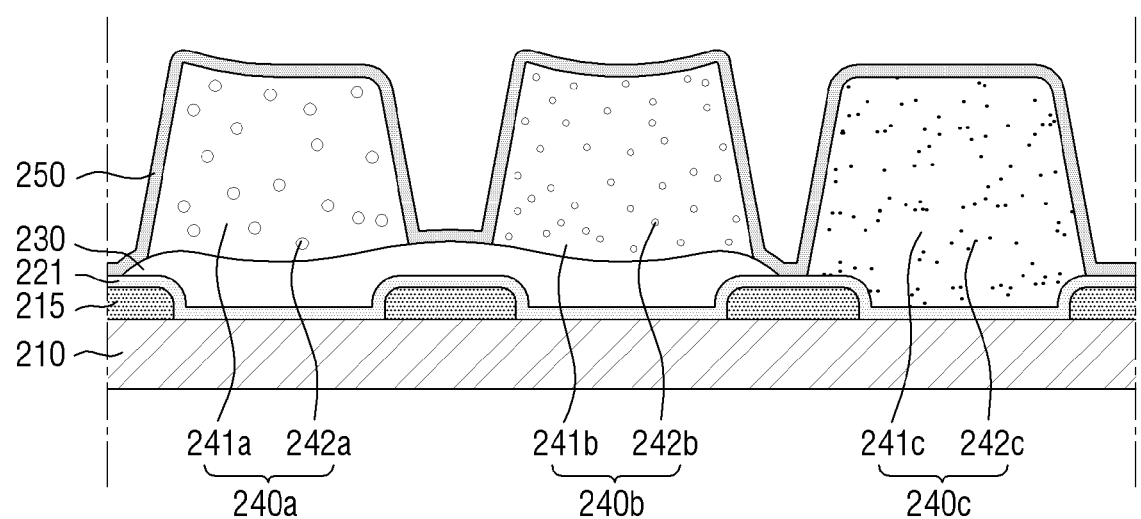

Referring to FIG. 11, a first wavelength band filter 230, color conversion patterns 240a and 240b, a light transmitting pattern 240c, and a second wavelength band filter 250 are formed on a second insulating substrate 210 including a light shielding member 215 and a first protective layer 221 formed thereon.

The first wavelength band filter 230 may be patterned to be disposed only in certain pixels by exposing and developing a photosensitive organic material. In some exemplary embodiments in which the first wavelength band filter 230 includes one or more layers made of an inorganic material, the first wavelength band filter 230 may be formed by depositing an inorganic material using a method such as chemical vapor deposition.

Then, the light transmitting pattern 240c, the first color conversion pattern 240a, and the second color conversion pattern 240b are formed. The light transmitting pattern 240c may be patterned by exposing and developing a photosensitive organic material including light scattering particles 242c. In addition, each of the first color conversion pattern 240a and the second color conversion pattern 240b may be patterned by exposing and developing a photosensitive organic material including a wavelength shift material 242a or 242b. However, exemplary embodiments are not limited to the above method. In some exemplary embodiments in which the first color conversion pattern 240a and/or the second color conversion pattern 240b are color filters, the first color conversion pattern 240a and/or the second color conversion pattern 240b may be patterned by exposing and developing a photosensitive organic material in which a colorant or dye is dispersed and dissolved. A maximum thickness of each of the first color conversion pattern 240a and the second color conversion pattern 240b may be about 6 μm to about 7 μm, and a maximum thickness of the light transmitting pattern 240c may be about 7 μm to about 8 μm.

Next, the second wavelength band filter 250 is formed on the first color conversion pattern 240a, the second color conversion pattern 240b, and the light transmitting pattern 240c. The second wavelength band filter 250 may be formed by depositing an inorganic material using a method such as chemical vapor deposition. When the second wavelength band filter 250 includes a plurality of layers, the transmission wavelength band and the reflection wavelength band of the second wavelength band filter 250 may be controlled by, but not limited to, the material, refractive index, and deposition thickness of each layer.

Figure 12:
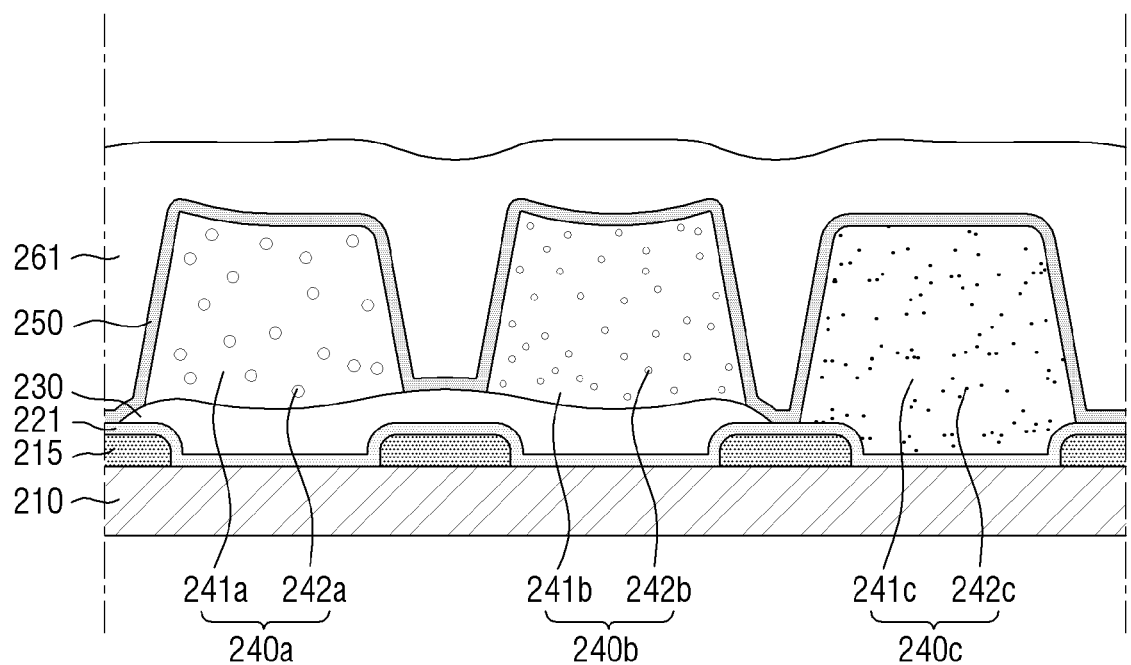

Referring to FIG. 12, a first overcoat layer 261 is formed on the second wavelength band filter 250. The forming of the first overcoat layer 261 may include applying a first overcoat composition and curing the first overcoat composition. The first overcoat composition may include an organic material, for example, a thermosetting resin material. In some exemplary embodiments, the curing of the first overcoat composition may include curing the first overcoat composition at a temperature of about 180° C. or less for about 20 minutes to about 35 minutes, e.g., about 30 minutes. If the first overcoat composition is cured at a temperature of 180° C. or less, the denaturation or damage of the wavelength shift materials 242a and 242b in the first color conversion pattern 240a and the second color conversion pattern 240b can be prevented or at least reduced.

Figure 13:
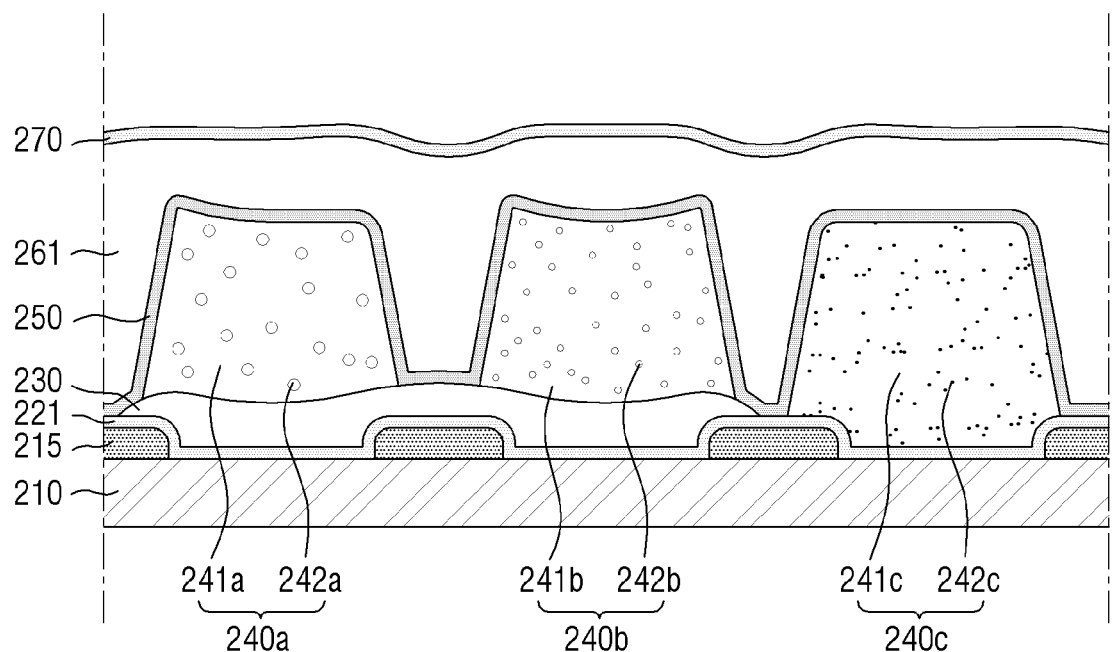

Next, referring to FIG. 13, a barrier layer 270 is formed on the first overcoat layer 261. The forming of the barrier layer 270 may include depositing a barrier layer forming material directly on the first overcoat layer 261 using a method such as chemical vapor deposition. In some exemplary embodiments, the barrier layer forming material may include one or more of silicon, nitrogen, and oxygen, and the barrier layer 270 may include one or more layers made of an insulating inorganic material. In addition, the depositing of the barrier layer forming material on the first overcoat layer 261 may include depositing the barrier layer forming material at a temperature of about 200° C. or less. If the barrier layer 270 is deposited at a temperature of 200° C. or less, the denaturation or damage of the wavelength shift materials 242a and 242b can be prevented or at least reduced. In addition, since the reflow of the first overcoat layer 261 can be suppressed, a high degree of planarization can be maintained.

Figure 14:
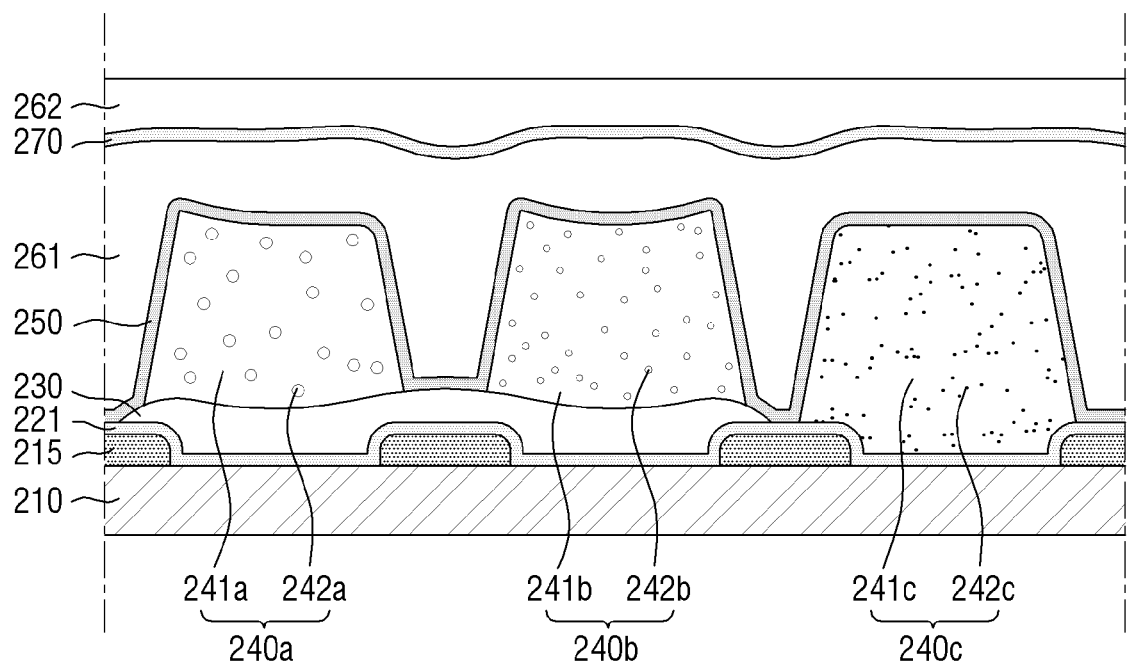

Referring to FIG. 14, a second overcoat layer 262 is formed on the barrier layer 270. The forming of the second overcoat layer 262 may include applying a second overcoat composition and curing the second overcoat composition. The second overcoat composition may include an organic material, such as a thermosetting resin material or a photocurable resin material.

In some exemplary embodiments, the second overcoat composition may include a thermosetting resin material, and the curing of the second overcoat composition may include curing the second overcoat composition at a temperature of about 180° C. or less for about 20 minutes to about 35 minutes, e.g., about 30 minutes. If the second overcoat composition is cured at a temperature of 180° C. or less, the denaturation or damage of the wavelength shift materials 242a and 242b can be prevented or at least reduced. In addition, since the stress at an interface between the first overcoat layer 261 and the barrier layer 270 can be minimized, a superior degree of planarization can be maintained.

In some exemplary embodiments, the second overcoat composition may include a photocurable resin material, and the curing of the second overcoat composition may include curing the second overcoat composition by irradiating light to the second overcoat composition. If the second overcoat composition is made of a photocurable resin material and photocured, the stress at the interface between the first overcoat layer 261 and the barrier layer 270 can be minimized or at least reduced. In addition, overcoat layers including the first overcoat layer 261 and the second overcoat layer 262 can be given a complex function having both a planarization characteristic and a reflow suppression characteristic.

Figure 15:
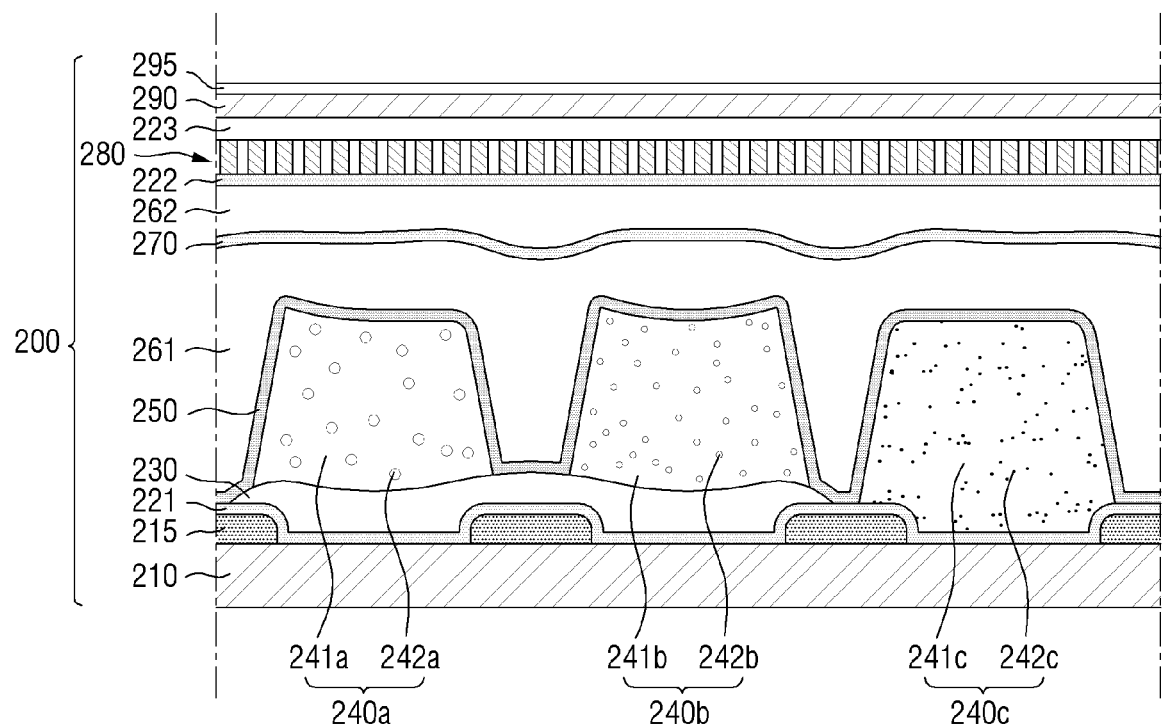

Referring to FIG. 15, a second protective layer 222, a second polarizer 280, a capping layer 223, a common electrode 290, and a second liquid crystal alignment layer 295 are formed on the second overcoat layer 262 to prepare an upper panel 200. Since each of the aforementioned components has been previously described with reference to FIG. 1 and the like, a detailed description of these components will be omitted to avoid obscuring exemplary embodiments.

Figure 16:
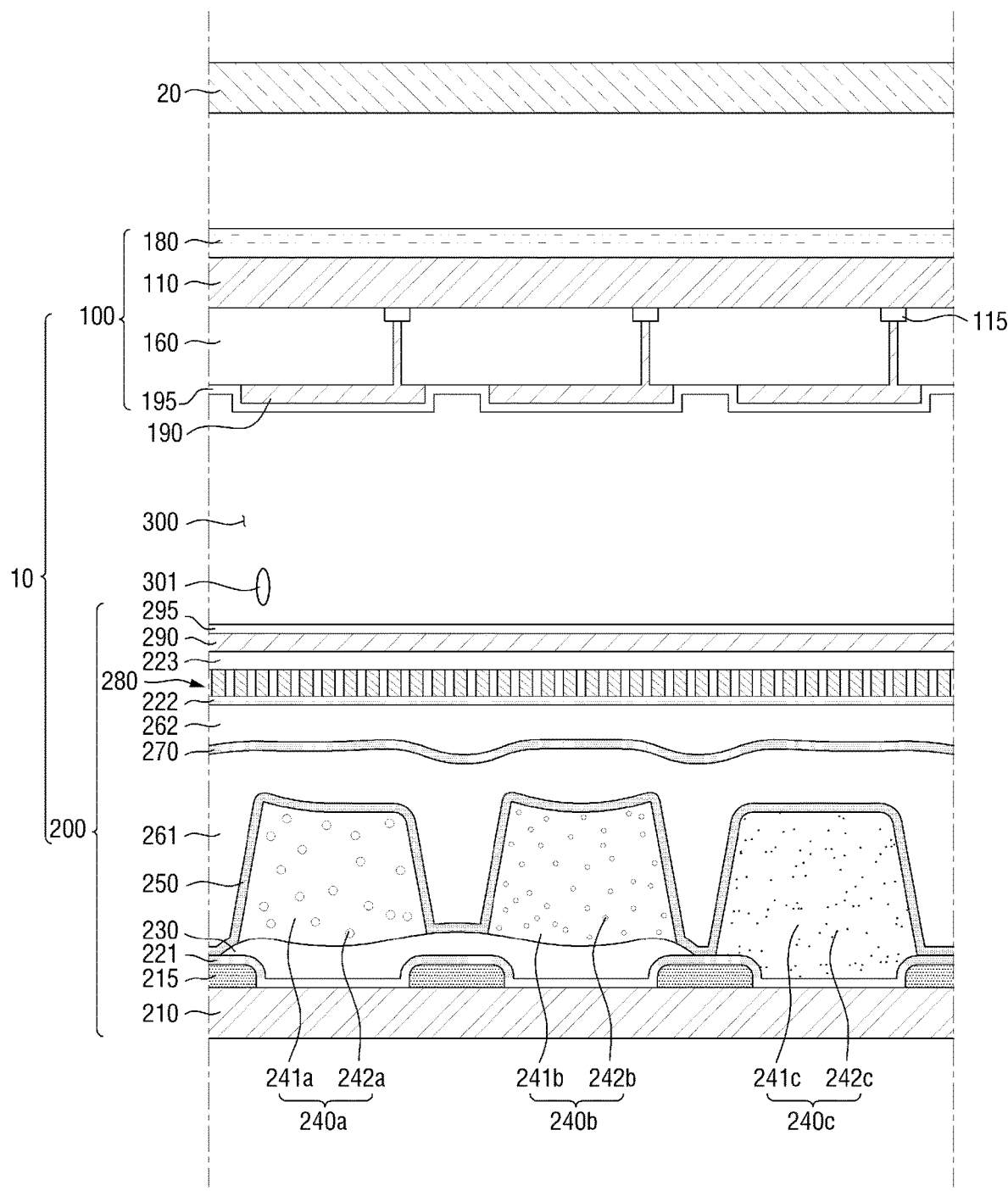

Referring to FIG. 16, a lower panel 100 including a first insulating substrate 110, switching elements 115, pixel electrodes 190, a first liquid crystal alignment layer 195, an intermediate layer 160, and a first polarizer 180 is prepared. Then, a liquid crystal layer 300 is interposed between the lower panel 100 and the upper panel 200. As a result, a display panel 10 is prepared.

The liquid crystal layer 300 may be interposed between the lower panel 100 and the upper panel 200 by bonding the lower panel 100 and the upper panel 200 together using a sealing member (not illustrated) and then injecting a liquid crystal composition containing liquid crystals 301 between the lower panel 100 and the upper panel 200. Alternatively, the liquid crystal layer 300 may be interposed between the lower panel 100 and the upper panel 200 by dropping the liquid crystal composition containing the liquid crystals 301 onto the lower panel 100 or the upper panel 200 and then bonding the lower panel 100 and the upper panel 200 together. Then, a light source unit 20 may be placed on the display panel 10 to provide light to the display panel 10.

According to various exemplary embodiments, a method of manufacturing a display device can realize a high degree of planarization by placing the first overcoat layer 261 and the second overcoat layer 262 on the first color conversion pattern 240a, the second color conversion pattern 240b, and the light transmitting pattern 240c that form a relatively high step.

In addition, when the first overcoat layer 261 and the second overcoat layer 262 are sequentially cured, if the second overcoat layer 262 is cured at a low temperature of about 180° C. or less in order to prevent the denaturation or damage of the wavelength shift materials 242a and 242b, the surface profile of the second overcoat layer 262 may be affected by the outgassing of a gas generated in the first overcoat layer 261 and/or the diffusion of a residual solvent in the first overcoat layer 261. However, according to various exemplary embodiments, a display device may be formed such that the surface of the second overcoat layer 262 has a more superior degree of planarization by forming the first overcoat layer 261 and forming the second overcoat layer 262 after forming the barrier layer 270 directly on the first overcoat layer 261.

Hereinafter, effects of various exemplary embodiments will be described in more detail with reference to experimental examples.

EXAMPLE 1

Patterns were formed to a thickness of about 7 μm (a thickness of a top portion) on a glass substrate using a photosensitive organic material. An average width of the patterns was about 100 μm, and an average distance between adjacent patterns was about 5 μm. Then, an acrylic resin composition was coated on the patterns and then cured at 180° C. to form a first overcoat layer. A silicon nitride film (a barrier layer) having a thickness of 0.1 μm was formed on a surface of the first overcoat layer using a chemical vapor deposition method. An acrylic resin composition was coated on the silicon nitride film and then cured at 180° C. to form a second overcoat layer. An average thickness of the cured second overcoat layer was about 1 μm. The surface height profiles of the patterns, the first overcoat layer, and the second overcoat layer formed on the glass substrate were measured using an interferometer, and the results are illustrated in FIG. 17.

COMPARATIVE EXAMPLE

Patterns were formed to a thickness of about 7 μm (a thickness of a top portion) on a glass substrate using a photosensitive organic material. An average width of the patterns was about 100 μm, and an average distance between adjacent patterns was about 5 μm. Then, an acrylic resin composition was coated on the patterns and then cured at 180° C. to form a first overcoat layer. An acrylic resin composition was coated on the first overcoat layer and then cured at 180° C. to form a second overcoat layer. An average thickness of the cured second overcoat layer was about 1 μm. The surface height profiles of the patterns, the first overcoat layer, and the second overcoat layer formed on the glass substrate were measured using an interferometer, and the results are illustrated in FIG. 18.

FIG. 17 illustrates the results of measuring the height profile of a substrate manufactured according to the Example 1, and FIG. 18 illustrates the results of measuring the height profile of a substrate manufactured according to the Comparative Example.

Referring to FIG. 17, when upper portions of patterns having a thickness of 7 μm are planarized using a first overcoat layer, a barrier layer and a second overcoat layer according to Example 1, an average step of the surface of the first overcoat layer that primarily planarizes the upper portions of the 7 μm-thick patterns is about 80 μm to about 100 μm, but an average step of the surface of the second overcoat layer is about 30 μm or less. That is, it can be understood that the barrier layer and the second overcoat layer disposed on the first overcoat layer have a secondary planarizing effect.

Referring to FIG. 18, when upper portions of patterns having a thickness of 7 μm are planarized using a first overcoat layer and a second overcoat layer according to the Comparative Example, an average step of the surface of the first overcoat layer that primarily planarizes the upper portions of the 7 μm-thick patterns is about 80 μm to about 100 μm, which is similar to Example 1. However, an average step of the surface of the second overcoat layer is about 70 μm. That is, it can be understood that the second overcoat layer disposed on the first overcoat layer hardly performs a planarization function. In particular, the surface of the second overcoat layer rises at a position corresponding to a valley formed between adjacent 7 μm-thick patterns. In other words, it can be understood from the above experimental examples that the planarization characteristics of the surface of the second overcoat layer can be maximized (or at least increased) when the barrier layer made of an inorganic material is interposed between the first overcoat layer and the second overcoat layer.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A display device comprising:
a first pixel region configured to display a first color;
a second pixel region configured to display a second color of a shorter peak wavelength than the first color, the second pixel region being adjacent to the first pixel region;
a color conversion pattern configured to:
convert a color of incident light into the first color; and
output converted light of the first color, the color conversion pattern being disposed in the first pixel region;
a first overcoat layer disposed on the color conversion pattern;
a barrier layer disposed on the first overcoat layer; and
a second overcoat layer disposed on the barrier layer, wherein:
the barrier layer is made of an inorganic material;
the second overcoat layer is made of an organic material; and
the first overcoat layer comprises irregular grooves facing the color conversion pattern in at least one of the first and second pixel regions.

2. The display device of claim 1, wherein:
the first overcoat layer is made of an organic material; and
the barrier layer is made of an insulating inorganic material.

3. The display device of claim 2, wherein:
entire opposing surfaces of the first overcoat layer and the barrier layer are in contact with each other in the first pixel region; and
entire opposing surfaces of the barrier layer and the second overcoat layer are in contact with each other in the first pixel region.

4. The display device of claim 3, further comprising:
a liquid crystal layer disposed on the second overcoat layer;
a switching element disposed on the liquid crystal layer;
a reflective polarizer disposed between the second overcoat layer and the liquid crystal layer; and
a light source configured to provide light of the second color towards the liquid crystal layer.

5. The display device of claim 4, further comprising:
a first protective layer disposed between the second overcoat layer and the reflective polarizer, the first protective layer being in contact with the second overcoat layer and the reflective polarizer, the first protective layer being made of an insulating inorganic material;
a capping layer disposed between the reflective polarizer and the liquid crystal layer, the capping layer being disposed directly on the reflective polarizer to cover the reflective polarizer;
a transparent electrode disposed between the capping layer and the liquid crystal layer, the transparent electrode being disposed directly on the capping layer; and
a liquid crystal alignment layer disposed between the transparent electrode and the liquid crystal layer, the liquid crystal alignment layer being disposed directly on the transparent electrode.

6. The display device of claim 5, wherein the reflective polarizer comprises:
a first wire grid pattern layer disposed directly on the first protective layer, the first wire grid pattern layer being made of a conductive material; and
a second wire grid pattern layer disposed directly on the first wire grid pattern layer, a shape of the second wire grid pattern layer corresponding to that of the first wire grid pattern layer, the second wire grid pattern layer being made of an insulating material.

7. The display device of claim 3, wherein:
an interface between the first overcoat layer and the barrier layer comprises irregular grooves; and
a thickness of the barrier layer is constant along a surface of the first overcoat layer.

8. The display device of claim 7, wherein:
a minimum thickness of the first overcoat layer is greater than a maximum thickness of the second overcoat layer; and
a minimum thickness of the second overcoat layer is greater than a maximum thickness of the barrier layer.

9. The display device of claim 7, wherein the first overcoat layer and the second overcoat layer are made of different organic materials.

10. The display device of claim 3, further comprising:
a first wavelength band filter disposed between the color conversion pattern and the first overcoat layer, the first wavelength band filter being in contact with the color conversion pattern and the first overcoat layer,
wherein the first wavelength band filter is configured to:
transmit light of a wavelength band comprising the peak wavelength of the second color; and
reflect light of a wavelength band comprising the peak wavelength of the first color.

11. The display device of claim 10, wherein:
the first wavelength band filter comprises a plurality of first refraction layers and a plurality of second refraction layers stacked alternately; and
an index of refraction of each of the plurality of first refraction layers is lower than an index of refraction of each of the plurality of second refraction layers.

12. The display device of claim 11, wherein a thickness of the first wavelength band filter is substantially constant along an outer surface of the color conversion pattern.

13. The display device of claim 10, further comprising:
a light transmitting pattern disposed in the second pixel region, the light transmitting pattern being spaced apart from the first wavelength band filter in a direction normal to the incident light.

14. The display device of claim 13, wherein the color conversion pattern is spaced apart from the light transmitting pattern in the direction normal to the incident light.

15. The display device of claim 14, wherein:
the color conversion pattern comprises:
a first base resin; and
a wavelength shift material dispersed in the first base resin, the wavelength shift material being configured to shift a peak wavelength of the incident light to the peak wavelength of the first color;
the light transmitting pattern comprises:
a second base resin; and
light scattering particles dispersed in the second base resin; and
a maximum thickness of the light transmitting pattern is greater than a maximum thickness of the color conversion pattern.

16. The display device of claim 13, further comprising:
a substrate; and a second wavelength band filter disposed between the substrate and the color conversion pattern, the second wavelength band filter being in contact with the color conversion pattern, wherein the second wavelength band filter is configured to:
   transmit light of a wavelength band comprising the peak wavelength of the first color; and
   reflect or absorb light of a wavelength band comprising the peak wavelength of the second color, and
wherein the second wavelength band filter is spaced apart from the light transmitting pattern in the direction normal to the incident light.

17. The display device of claim 16, further comprising:
a third pixel region configured to display a third color of a longer peak wavelength than the second color and different from the first color, the third pixel region being adjacent to the first pixel region,
wherein the second wavelength band filter integrally extends in the first pixel region and the third pixel region.

18. The display device of claim 16, further comprising:
a light shielding member disposed between the substrate and the second wavelength band filter, the light shielding member overlapping each of the color conversion pattern and the light transmitting pattern; and
a second protective layer disposed between the light shielding member and the second wavelength band filter, the second protective layer being disposed between the light shielding member and the light transmitting pattern,
wherein:
   the second protective layer is in contact with the light shielding member, the second wavelength band filter, and the light transmitting pattern;
   the second protective layer is made of an insulating inorganic material; and
   the color conversion pattern is spaced apart from the light transmitting pattern in the direction normal to the incident light.

* * * * *